United States Patent
Conway et al.

(10) Patent No.: US 7,869,586 B2
(45) Date of Patent: Jan. 11, 2011

(54) METHOD AND SYSTEM FOR AGGREGATING AND ANALYZING DATA RELATING TO A PLURALITY OF INTERACTIONS BETWEEN A CUSTOMER AND A CONTACT CENTER AND GENERATING BUSINESS PROCESS ANALYTICS

(75) Inventors: Kelly Conway, Lake Bluff, IL (US); David Gustafson, Lake Forest, IL (US); Douglas Brown, Austin, TX (US); Christopher Danson, Austin, TX (US)

(73) Assignee: eLoyalty Corporation, Lake Forest, IL (US)

( * ) Notice: Subject to any disclaimer, the term of this patent is extended or adjusted under 35 U.S.C. 154(b) by 956 days.

(21) Appl. No.: 11/731,497

(22) Filed: Mar. 30, 2007

(65) Prior Publication Data
US 2008/0240405 A1    Oct. 2, 2008

(51) Int. Cl.
*H04M 3/00* (2006.01)
*H04M 5/00* (2006.01)
(52) U.S. Cl. .................... 379/265.06; 379/265.01; 379/265.05; 379/265.11; 379/265.12
(58) Field of Classification Search ............ 379/265.06, 379/265.01, 265.05, 265.11, 265.12
See application file for complete search history.

(56) References Cited

U.S. PATENT DOCUMENTS

| 3,851,121 A | 11/1974 | Marvin |
| 3,855,416 A | 12/1974 | Fuller |
| 3,855,418 A | 12/1974 | Fuller |
| 3,971,034 A | 7/1976 | Bell, Jr. et al. |
| 4,093,821 A | 6/1978 | Williamson |
| 4,142,067 A | 2/1979 | Williamson |
| 4,377,158 A | 3/1983 | Friedman et al. |

(Continued)

FOREIGN PATENT DOCUMENTS

EP    0 862 304 A2    9/1998

(Continued)

OTHER PUBLICATIONS

Abstract: Couretas, John, Automotive News, "Car Dealer Management Software Systems are Being Re-Engineered with Web Technology to Allow Greater Communications with Customers," Published in the United States, Nov. 1999, vol. 5847, 1 page.

(Continued)

*Primary Examiner*—Thjuan K Addy
(74) *Attorney, Agent, or Firm*—McDermott Will & Emery LLP

(57) ABSTRACT

A method and system for aggregating data associated with a plurality of interactions between at least one customer and at least one agent for generating business process analytics is provided. The method is implemented by a non-transitory computer readable medium having a plurality of code segments and includes selecting a range of the organized plurality of agents and identifying a plurality of interactions associated with an organized plurality of agents within the selected range, receiving voice data associated with each of the identified interactions and analyzing the voice data, agent call activity data, customer call activity data, and customer history data associated with each of the identified interactions, and generating business process analytics for the identified interactions.

19 Claims, 16 Drawing Sheets

U.S. PATENT DOCUMENTS

| | | | |
|---|---|---|---|
| 4,490,840 A | 12/1984 | Jones | |
| 4,694,483 A | 9/1987 | Cheung | |
| 5,148,483 A | 9/1992 | Silverman | |
| 5,148,493 A | 9/1992 | Bruney | |
| 5,206,903 A | 4/1993 | Kohler et al. | |
| 5,239,460 A | 8/1993 | LaRoche | |
| 5,299,260 A | 3/1994 | Shaio | |
| 5,467,391 A | 11/1995 | Donaghue et al. | |
| 5,500,795 A | 3/1996 | Powers et al. | |
| 5,535,256 A | 7/1996 | Maloney et al. | |
| 5,559,875 A | 9/1996 | Bieselin et al. | |
| 5,561,707 A | 10/1996 | Katz | |
| 5,577,254 A | 11/1996 | Gilbert | |
| 5,590,171 A | 12/1996 | Howe et al. | |
| 5,590,188 A | 12/1996 | Crockett | |
| 5,594,790 A | 1/1997 | Curren et al. | |
| 5,594,791 A | 1/1997 | Szlam et al. | |
| 5,621,789 A | 4/1997 | McCalmont et al. | |
| 5,633,916 A | 5/1997 | Goldhagen et al. | |
| 5,646,981 A | 7/1997 | Klein | |
| 5,696,811 A | 12/1997 | Maloney et al. | |
| 5,710,884 A | 1/1998 | Dedrick | |
| 5,712,954 A | 1/1998 | Dezonno | |
| 5,717,742 A | 2/1998 | Hyde-Thomson | |
| 5,721,827 A | 2/1998 | Logan et al. | |
| 5,724,420 A | 3/1998 | Torgrim | |
| 5,732,216 A | 3/1998 | Logan et al. | |
| 5,734,890 A | 3/1998 | Case et al. | |
| 5,737,405 A | 4/1998 | Dezonno | |
| 5,757,904 A | 5/1998 | Anderson | |
| 5,764,728 A | 6/1998 | Ala et al. | |
| 5,768,513 A | 6/1998 | Kuthyar et al. | |
| 5,784,452 A | 7/1998 | Carney | |
| 5,790,798 A | 8/1998 | Beckett, II et al. | |
| 5,799,063 A | 8/1998 | Krane | |
| 5,809,250 A | 9/1998 | Kisor | |
| 5,815,551 A | 9/1998 | Katz | |
| 5,818,907 A | 10/1998 | Maloney et al. | |
| 5,818,909 A | 10/1998 | Van Berkum et al. | |
| 5,822,306 A | 10/1998 | Catchpole | |
| 5,822,400 A | 10/1998 | Smith | |
| 5,822,410 A | 10/1998 | McCausland et al. | |
| 5,822,744 A | 10/1998 | Kesel | |
| 5,825,869 A | 10/1998 | Brooks et al. | |
| 5,828,730 A | 10/1998 | Zebryk et al. | |
| 5,841,966 A | 11/1998 | Irribarren | |
| 5,845,290 A | 12/1998 | Yoshii | |
| 5,848,396 A | 12/1998 | Gerace | |
| 5,854,832 A | 12/1998 | Dezonno | |
| 5,857,175 A | 1/1999 | Day et al. | |
| 5,859,898 A | 1/1999 | Checco | |
| 5,864,616 A | 1/1999 | Hartmeier | |
| 5,870,549 A | 2/1999 | Bobo, II | |
| 5,875,436 A | 2/1999 | Kikinis | |
| 5,878,384 A | 3/1999 | Johnson et al. | |
| 5,884,032 A | 3/1999 | Bateman et al. | |
| 5,884,262 A | 3/1999 | Wise et al. | |
| 5,894,512 A | 4/1999 | Zenner | |
| 5,897,616 A | 4/1999 | Kanevsky et al. | |
| 5,903,641 A | 5/1999 | Tonisson | |
| 5,910,107 A | 6/1999 | Iliff | |
| 5,911,776 A | 6/1999 | Guck | |
| 5,914,951 A | 6/1999 | Bentley et al. | |
| 5,915,001 A | 6/1999 | Uppaluru | |
| 5,915,011 A | 6/1999 | Miloslavsky | |
| 5,923,746 A | 7/1999 | Baker | |
| 5,926,538 A | 7/1999 | Deryugen | |
| 5,930,764 A | 7/1999 | Melchione et al. | |
| 5,940,476 A | 8/1999 | Morgenstein et al. | |
| 5,940,494 A | 8/1999 | Rafacz | |
| 5,940,792 A | 8/1999 | Hollier | |
| 5,943,416 A | 8/1999 | Gisby | |
| 5,945,989 A | 8/1999 | Freishtat | |
| 5,946,375 A | 8/1999 | Pattison et al. | |
| 5,946,388 A | 8/1999 | Walker et al. | |
| 5,951,643 A | 9/1999 | Shelton et al. | |
| 5,953,389 A | 9/1999 | Pruett | |
| 5,953,406 A | 9/1999 | LaRue et al. | |
| 5,964,839 A | 10/1999 | Johnson et al. | |
| 5,978,465 A | 11/1999 | Corduroy et al. | |
| 5,987,415 A | 11/1999 | Breese et al. | |
| 5,991,735 A | 11/1999 | Gerace | |
| 6,003,013 A | 12/1999 | Boushy et al. | |
| 6,006,188 A | 12/1999 | Bogdashevsky et al. | |
| 6,009,163 A | 12/1999 | Nabkel et al. | |
| 6,014,647 A | 1/2000 | Nizzari et al. | |
| 6,021,428 A | 2/2000 | Miloslavsky | |
| 6,026,397 A | 2/2000 | Sheppard | |
| 6,029,153 A | 2/2000 | Bauchner et al. | |
| 6,058,163 A | 5/2000 | Pattison et al. | |
| 6,064,731 A | 5/2000 | Flockhart et al. | |
| 6,078,891 A | 6/2000 | Riordan | |
| 6,108,711 A | 8/2000 | Beck et al. | |
| 6,128,380 A | 10/2000 | Shaffer et al. | |
| 6,151,571 A | 11/2000 | Pertrushin | |
| 6,173,053 B1 | 1/2001 | Bogart et al. | |
| 6,185,534 B1 | 2/2001 | Breese et al. | |
| 6,195,426 B1 | 2/2001 | Bolduc et al. | |
| 6,205,215 B1 | 3/2001 | Dombakly | |
| 6,212,502 B1 | 4/2001 | Ball et al. | |
| 6,243,684 B1 | 6/2001 | Stuart et al. | |
| 6,275,806 B1 | 8/2001 | Pertrushin | |
| 6,286,030 B1 | 9/2001 | Wenig et al. | |
| 6,289,094 B1 | 9/2001 | Miloslavsky | |
| 6,295,353 B1 | 9/2001 | Flockhart et al. | |
| 6,334,110 B1 | 12/2001 | Walter et al. | |
| 6,345,094 B1 | 2/2002 | Khan et al. | |
| 6,353,810 B1 | 3/2002 | Petrushin | |
| 6,363,145 B1 | 3/2002 | Shaffer et al. | |
| 6,363,346 B1 | 3/2002 | Walters | |
| 6,366,658 B1 | 4/2002 | Bjornberg et al. | |
| 6,366,666 B2 | 4/2002 | Bengston et al. | |
| 6,370,574 B1 | 4/2002 | House et al. | |
| 6,389,132 B1 | 5/2002 | Price | |
| 6,392,666 B1 | 5/2002 | Hong et al. | |
| 6,404,883 B1 | 6/2002 | Hartmeier | |
| 6,411,687 B1 | 6/2002 | Bohacek et al. | |
| 6,411,708 B1 | 6/2002 | Khan | |
| 6,424,709 B1 | 7/2002 | Doyle et al. | |
| 6,434,230 B1 | 8/2002 | Gabriel | |
| 6,434,231 B2 | 8/2002 | Neyman et al. | |
| 6,446,119 B1 | 9/2002 | Olah et al. | |
| 6,466,663 B1 | 10/2002 | Ravenscroft et al. | |
| 6,480,601 B1 | 11/2002 | McLaughlin | |
| 6,480,826 B2 | 11/2002 | Pertrushin | |
| 6,490,560 B1 | 12/2002 | Ramaswamy et al. | |
| 6,510,220 B1 | 1/2003 | Beckett et al. | |
| 6,535,601 B1 | 3/2003 | Flockhart et al. | |
| 6,542,156 B1 | 4/2003 | Hong et al. | |
| 6,542,602 B1 | 4/2003 | Elazar | |
| 6,553,112 B2 | 4/2003 | Ishikawa | |
| 6,553,114 B1 * | 4/2003 | Fisher et al. | 379/265.12 |
| 6,556,976 B1 | 4/2003 | Callen | |
| 6,567,504 B1 | 5/2003 | Kercheval et al. | |
| 6,567,787 B1 | 5/2003 | Walker et al. | |
| 6,574,605 B1 | 6/2003 | Sanders et al. | |
| 6,598,020 B1 | 7/2003 | Kleindienst et al. | |
| 6,600,821 B1 | 7/2003 | Chan et al. | |
| 6,601,031 B1 | 7/2003 | O'Brien | |
| 6,611,498 B1 | 8/2003 | Baker et al. | |
| 6,628,777 B1 | 9/2003 | McIllwaine et al. | |
| 6,643,622 B2 | 11/2003 | Stuart et al. | |
| 6,647,372 B1 | 11/2003 | Brady et al. | |
| 6,658,388 B1 | 12/2003 | Kleindienst et al. | |

| | | |
|---|---|---|
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,700,972 B1 | 3/2004 | McGugh et al. |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,760,414 B1 | 7/2004 | Schurko et al. |
| 6,760,727 B1 | 7/2004 | Schroeder et al. |
| 6,766,012 B1 | 7/2004 | Crossley |
| 6,788,768 B1 | 9/2004 | Saylor et al. |
| 6,798,876 B1 | 9/2004 | Bala |
| 6,839,671 B2 | 1/2005 | Attwater et al. |
| 6,853,966 B2 | 2/2005 | Bushey et al. |
| 6,864,901 B2 | 3/2005 | Chang et al. |
| 6,868,392 B1 | 3/2005 | Ogasawara |
| 6,959,079 B2 | 10/2005 | Elazar |
| 6,973,176 B1 * | 12/2005 | Chism et al. ........... 379/265.12 |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,219,138 B2 | 5/2007 | Straut et al. |
| 2001/0043685 A1 | 11/2001 | Bscheider et al. |
| 2002/0002460 A1 | 1/2002 | Perturshin |
| 2002/0002464 A1 | 1/2002 | Perturshin |
| 2002/0010587 A1 | 1/2002 | Perturshin |
| 2002/0111811 A1 | 8/2002 | Bares et al. |
| 2002/0133394 A1 | 9/2002 | Bushey et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0154092 A1 | 8/2003 | Bouron et al. |
| 2004/0041830 A1 | 3/2004 | Chiang et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0101127 A1 | 5/2004 | Dezonno et al. |
| 2004/0117185 A1 | 6/2004 | Scarano et al. |
| 2004/0162724 A1 | 8/2004 | Hill et al. |
| 2004/0181376 A1 | 9/2004 | Fables et al. |
| 2004/0190687 A1 | 9/2004 | Baker |
| 2004/0249636 A1 | 12/2004 | Applebaum |
| 2004/0249650 A1 | 12/2004 | Freedman et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0018622 A1 | 1/2005 | Halbraich et al. |
| 2005/0108383 A1 | 5/2005 | DeHaas et al. |
| 2005/0108775 A1 | 5/2005 | Bachar et al. |
| 2005/0123115 A1 | 6/2005 | Gritzer et al. |
| 2006/0074898 A1 | 4/2006 | Gavalda et al. |
| 2006/0150229 A1 | 7/2006 | Blair et al. |
| 2006/0168188 A1 | 7/2006 | Dutton |
| 2006/0200520 A1 | 9/2006 | Vernon et al. |
| 2006/0262919 A1 | 11/2006 | Danson et al. |
| 2006/0262920 A1 | 11/2006 | Conway et al. |
| 2006/0265088 A1 | 11/2006 | Warford et al. |
| 2006/0265089 A1 | 11/2006 | Conway et al. |
| 2006/0265090 A1 | 11/2006 | Conway et al. |
| 2007/0106791 A1 | 5/2007 | Blumenau |
| 2007/0106792 A1 | 5/2007 | Blumenau |

FOREIGN PATENT DOCUMENTS

| | | |
|---|---|---|
| EP | 0 863 678 A2 | 9/1998 |
| EP | 0 998 108 A1 | 5/2000 |
| EP | 1361739 A1 | 11/2003 |
| EP | 1 635 534 A2 | 3/2006 |
| GB | 2 331 201 A | 5/1999 |
| GB | 2 389 736 A | 12/2003 |
| WO | WO 0174042 A2 | 10/2001 |
| WO | WO 0217165 A2 | 2/2002 |
| WO | WO 02073413 A2 | 9/2002 |
| WO | WO 03001809 A1 | 1/2003 |
| WO | WO 03009175 A1 | 1/2003 |
| WO | WO 2006124942 A1 | 11/2006 |
| WO | WO 2006124945 A1 | 11/2006 |
| WO | WO 2006125047 A1 | 11/2006 |
| WO | WO 2007100345 A1 | 9/2007 |
| WO | WO 2007106113 A2 | 9/2007 |

OTHER PUBLICATIONS

Abstract: Retail Banker International, "Efficiency Ratio (ER), is Increasingly Being Looked to by Bankers, Analysts as a Yardstick of Operating Success, in Era of Permanent Downsizing and Cost Reduction," vol. 341, Published in Ireland; Jan. 1996, 2 pages.

Article: Call Center Magazine, The Most Innovative Call Center Products We Saw in 1999, vol. 13, No. 2, 9 pages.

Article: Kohli, Rajiv et al., Journal of System Management, "Strategic Application of Organization Data Through Customer Relational Databases," vol. 44, No. 10, Oct. 1993, 7 pages.

Abstract: Sullivan, Kristina B., PC Week, Product Announcement, "Software Helps Salespeople Generate New Leads," vol. 3, No. 38, Sep. 1986, 1 page.

Article: Garrison, P., Computing for Business, "An Electronic Sales Call File," vol. 9, No. 4, Apr. 1984, 2 pages.

Article: Killenbrew, Wayne et al., Telephony, "Playing by the Rules," vol. 235, No. 25, Dec. 1998, 4 pages.

Article: Testa, Bridget Mintz, Telecommunications Americas, "Call Monitoring Gets Emotional," vol. 38, No. 13, Dec. 2004, 1 page.

Abstract: Tan, Run-Hua et al., Journal of Hebei University of Technology, "Innovation Design of Product Based on TRIZ," vol. 33, No. 2, 2004, 1 page.

Article: Newswire, "etalk and Utopy to Provide Enhanced Quality Monitoring and Speech Analytics Solutions to Contact Centers," Apr. 2003, 2 pages.

* cited by examiner

| NUMBER OF DISTRESS | EMOTIONS | THOUGHTS | REACTIONS | OPINIONS | TOTAL |
|---|---|---|---|---|---|
| 2-3 | 1,946 | 1,182 | 536 | 184 | 3,848 |
| 4-5 | 371 | 259 | 102 | 19 | 751 |
| 6-9 | 139 | 117 | 49 | 8 | 313 |
| 10+ | 22 | 12 | 12 | 4 | 50 |
| TOTAL | 2,478 | 1,570 | 699 | 215 | 4,962 |

FIG. 14

| CALL TYPE | NON-INTERACTION TIME | | TRANSFER TIME | |
|---|---|---|---|---|
| | AVG. SECONDS PER CALL | CALLS PER DAY | AVG. SECONDS PER CALL | CALLS PER DAY |
| CURRENT BALANCE | 56 | 1,260 | 285 | 110 |
| NSF / OD | 86 | 1,244 | 412 | 44 |
| VERIFY DEPOSIT | 73 | 1024 | 219 | 48 |
| VERIFY CHECK | 75 | 850 | 385 | 20 |
| PENDING CHARGE | 94 | 520 | 449 | 16 |
| TRANSFER FUNDS | 76 | 387 | 250 | 96 |
| BANK CARD | 84 | 236 | 205 | 32 |
| ON-LINE INQUIRY | 159 | 224 | 487 | 16 |
| FEES | 65 | 154 | 364 | 16 |
| ACCOUNT MAINTENANCE | 82 | 140 | 245 | 20 |
| BRANCH INFORMATION | 101 | 120 | 426 | 16 |
| OTHER | 53 | 80 | 212 | 16 |
| TOTAL | | 6,239 | | 450 |

FIG. 16

| | DISSATISFIED CALL % | AGENT SCORE | AGENT VARIABILITY | BUSINESS PROCESS % | SIMPLE CALL % | AVERAGE HANDLE TIME |
|---|---|---|---|---|---|---|
| CLIENT | 14% | 91 | 85 | 14% | 6% | 5:21 |
| PEER 1 | 9% | 87 | 95 | 10% | 4% | 5:10 |
| PEER 2 | 18% | 79 | 68 | 18% | 10% | 4:39 |
| PEER 3 | 6% | 93 | 97 | 12% | 14% | 6:05 |
| INDUSTRY AVERAGE | 11% | 85 | 89 | 15% | 9% | 5:35 |

FIG. 17

METHOD AND SYSTEM FOR AGGREGATING AND ANALYZING DATA RELATING TO A PLURALITY OF INTERACTIONS BETWEEN A CUSTOMER AND A CONTACT CENTER AND GENERATING BUSINESS PROCESS ANALYTICS

CROSS-REFERENCE TO RELATED APPLICATIONS

Not applicable.

TECHNICAL FIELD

The present invention relates to a method and system for aggregating and analyzing a plurality of interactions between a customer and an agent at a contact center, and more particularly, for generating business process analytics associated with the interactions.

BACKGROUND OF THE INVENTION

It is known to utilize telephone call centers ("contact centers") to facilitate the receipt and response of telephone calls or other interactions between a customer and an agent or a customer service representative (CSR). Generally, a customer is in contact with a CSR who is responsible for answering the customer's inquiries and directing the customer to the appropriate individual, department, information source, or service as required to satisfy the customer's needs. It is well known to monitor interactions between a customer and a CSR.

Information gathered from the interactions can be used to monitor the performance of the business processes employed by a contact center to identify possible training needs or deficiencies in an overall operation of a contact center. Based on a review and analysis of a group of interactions, a monitor will make suggestions or recommendations to improve the quality of the customer's experience. However, the information gathered has been typically limited to the audio conversation between the customer and the CSR, data entered by the customer through the telephone key pad, and the screens viewed by the CSR. As such, the monitor is restricted in thoroughly evaluating the performance of the contact center's business processes, and in completely understanding the experience of the customer during the interaction. Furthermore, this data has historically been in an unstructured format that only allows for manual, human analysis versus a systematic, computer based analysis of agent performance.

In many instances, it may also be desirable to analyze the entirety of the aggregate data gleaned from a group of interactions to determine the efficiency of a contact center's business processes for particular types of interactions received at the contact center or to determine the efficiency of a contact center's business processes for particular customer segments. In addition, to obtain a more accurate analysis of a contact center's business processes, it would be useful to eliminate agent variability in an analysis of a contact center's business processes.

Thus, there is a need in customer relationship management ("CRM") for tools useful in fully evaluating a contact center's business processes. In particular, a need exists for tools that will allow for evaluating the adequacy of a contact center's business processes for particular interaction types received at the contact center and for the particular customer segments that a contact center services.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to the present invention, a computer program for aggregating data associated with a plurality of interactions between at least one customer and at least one agent for generating business process analytics is provided. The computer program is embodied on a computer readable storage medium adapted to control a computer. The computer program comprises a plurality of code segments for performing the task. In particular, a plurality of agents is organized according to a predetermined criteria, a range of the organized plurality of agents is selected, and a plurality of interactions associated with the organized plurality of agents within the selected range is identified.

Voice data associated with each of the identified interactions is received. Additionally, agent call activity data associated with each of the identified interactions, the agent call activity data comprising at least one of agent on-call activity data, agent after-call activity data, agent screen analytics and agent desktop recording data is received. Customer call activity data associated with each of the identified interactions is received. Customer history data corresponding to each customer of each of the identified interactions is also received. The voice data, the agent call activity data, the customer call activity data, and the customer history data associated with each of the identified interactions are analyzed and business process analytics are generated for the identified interactions. The business process analytics include generated dissatisfaction data for each of the identified interactions based on the analyzed voice data, the agent call activity data, the customer call activity data, and the customer history data.

According to another aspect of the invention, another embodiment of a computer readable medium for aggregating data associated with a plurality of interactions between at least one customer and at least one agent for generating business process analytics is provided. Again, the computer program is embodied on a computer readable storage medium adapted to control a computer. The computer program comprises a plurality of code segments for performing the task. In particular, at least two of a plurality of interactions between at least one customer and at least one agent are identified.

Voice data associated with each of the identified interactions is received. The code segment for receiving voice data includes instructions (e.g., a code segment) for separating the voice data into customer voice data and agent voice data. The separated agent voice data and the separated customer voice data are mined and analyzed by applying a linguistic-based psychological behavioral model thereto. From the analysis, behavioral assessment data corresponding to the separated agent voice data and the separated customer voice data is generated.

Agent call activity data associated with each of the identified interactions is received. The agent call activity data includes at least one of the following data types: agent on-call activity data, agent after-call activity data, agent screen analytics and agent desktop recording data. Customer call activity data and customer history data corresponding to each customer of each of the identified interactions are received. The behavioral assessment data, the agent call activity data, the customer call activity data, and the customer history data associated with each of the identified interactions are analyzed and dissatisfaction data for each of the identified interactions is generated based on the analyzed voice data, the agent call activity data, the customer call activity data, and the customer history data. Also, business process analytics are generated for the identified interactions, wherein the business process analytics include dissatisfaction data.

According to another aspect of the invention, the code segment for generating business process includes instructions (e.g., a code segment) for categorizing each of the identified interactions into one of a plurality of category types. The categorization is based on at least one of the following data types: the analyzed voice data, the agent call activity data, the customer call activity data, and the customer history data. In addition, the generated dissatisfaction data is aggregated relative to the categorized interactions associated therewith.

According to still another aspect of the invention, dissatisfaction data for each of the identified interactions is defined by at least one distress event. According to such an embodiment, the code segment for generating dissatisfaction data includes instructions (e.g., a code segment) for measuring each distress event occurring during each of the identified interactions. More particularly, the distress events are measured according to a predetermined distress event scale. A score is generated for each of the identified interactions based on each of the measured distress events. The score for each of the identified interactions is then compared against a threshold score, and an interaction is identified as a dissatisfactory interaction when the score of the interaction exceeds the threshold score.

According to another aspect of the invention, the code segment for generating dissatisfaction data includes instructions (e.g., a code segment) for categorizing each distress event occurring during each of the identified interactions into one of a plurality of distress category types.

According to yet another aspect of the invention, the code segment for generating dissatisfaction data includes instructions (e.g., a code segment) for incrementally registering distress events occurring during the identified interactions.

According to another aspect of the invention, the code segment for generating dissatisfaction data includes instructions (e.g., a code segment) for measuring each distress event occurring during the identified interactions in time units.

According to another aspect of the invention, the customer history data includes one or more of either: age, race, gender, income, behavioral type, customer spending, and customer tenure.

According to still another aspect of the invention, a code segment generates a graphical user interface adapted to display the business process analytics of the identified interactions.

According to another aspect of the invention, the separated agent voice data and the separated customer voice data are analyzed by applying a distress based model to the separated agent voice data and the separated customer voice data. Assessment data, which includes voice distress assessment data, is then generated corresponding to the separated agent voice data and the separated customer voice data.

According to another aspect of the invention, the received voice data is analyzed by applying a non-linguistic event analysis thereto. Assessment data, which includes phone event assessment data is then generated corresponding to the received voice data, the assessment data comprising phone event assessment data.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 14 is a graphical representation of generated business process analytics in accordance with the present invention;

FIG. 16 is a graphical representation of generated business process analytics in accordance with the present invention; and FIG. 17 is a graphical representation of generated business process analytics in accordance with the present invention.

DETAILED DESCRIPTION

Figure 1:
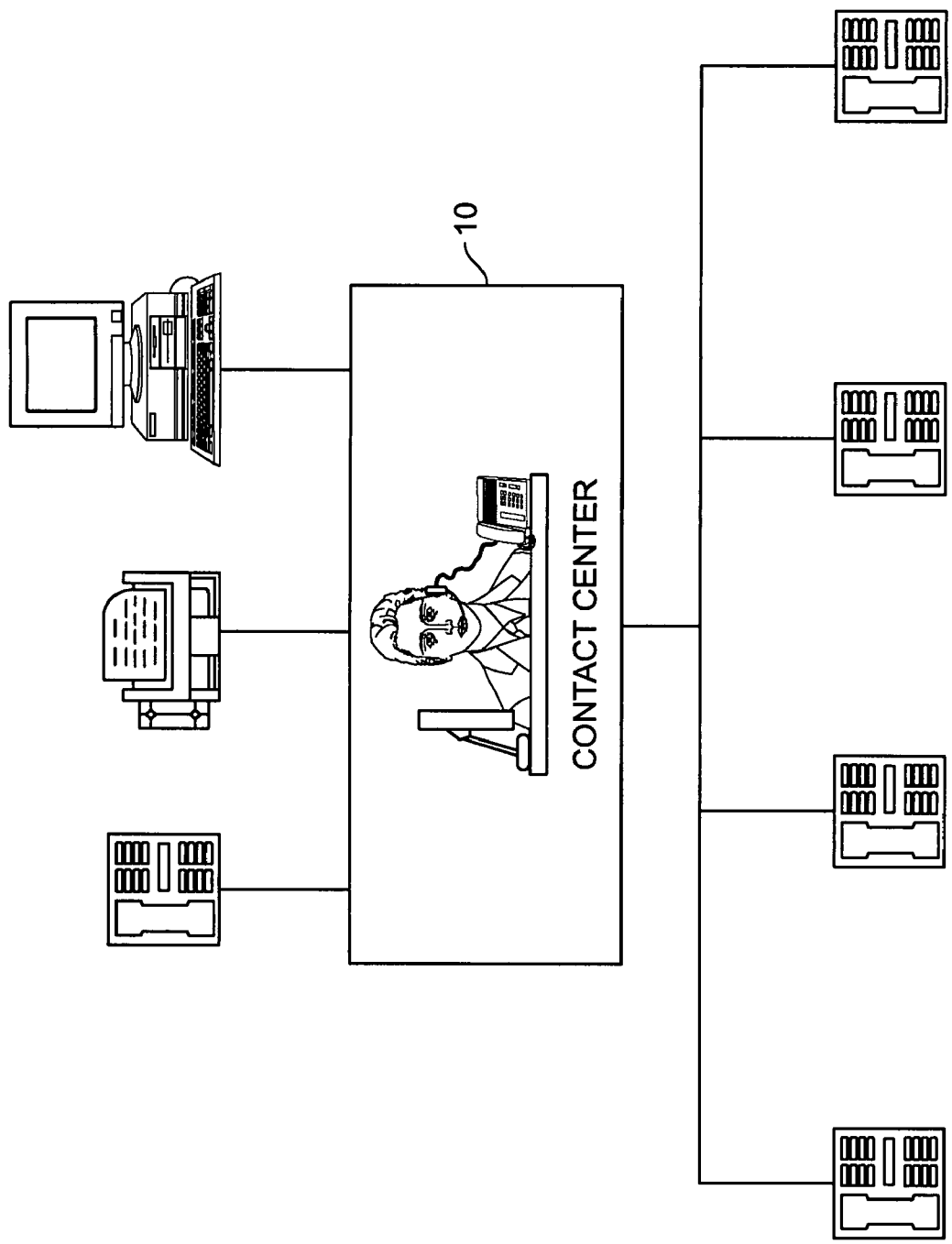
FIG. 1 is a block diagram of a contact center in accordance with the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-17, a method and system for analyzing a plurality of interactions between a customer and a CSR at a contact center for the purpose of generating business process analytics is provided. A "contact center" as used herein can include any facility or system server suitable for receiving and recording electronic interactions from customers. Such interactions can include, for example, telephone calls, facsimile transmissions, e-mails, web interactions, voice-over IP ("VoIP") and video. It is contemplated that these interactions may be transmitted by and through any type of telecommunication device and over any medium suitable for carrying data. For example, the interactions may be transmitted by or through telephone lines, cable or wireless communications. As shown in FIG. 1, the contact center 10 of the present invention facilitates interactions that occur between a customer and a contact center during fulfillment of a customer transaction.

In one embodiment, the system used in connection with the present method includes an interactive voice response (IVR) system, a telephone switch or switching system, a routing server and a recording server. Now will be described in more specific terms, the computer hardware associated with operating the computer program that may be used in connection with the present invention.

Process descriptions or blocks in figures should be understood as representing modules, segments, or portions of code which include one or more executable instruction for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 3:
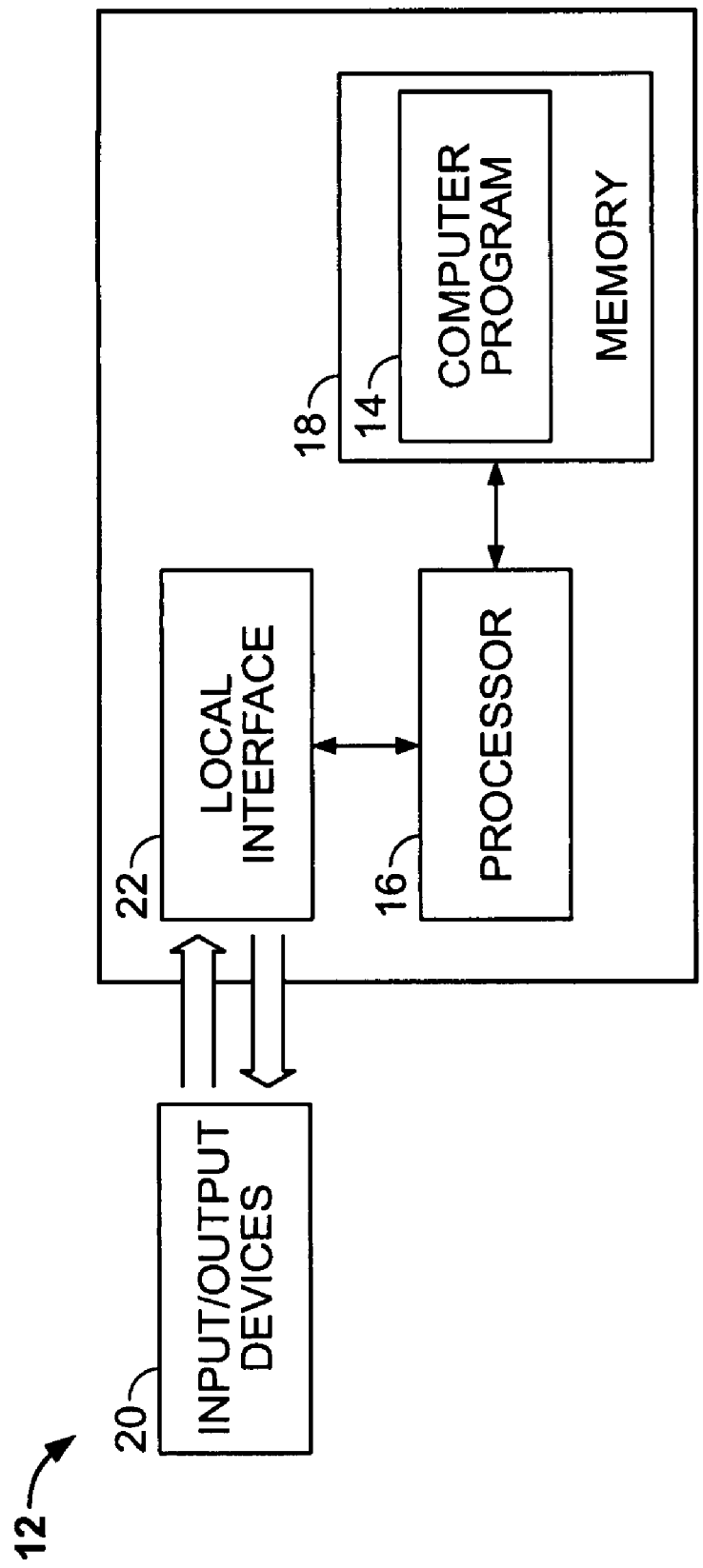
FIG. 3 is a block diagram of a computer used in connection with the present invention.

FIG. 3 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. In a currently contemplated preferred embodiment, the control system 14 is implemented as an executable program in software, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the control system 14 of the present invention is shown in FIG. 3. The control system 14 may reside in, or have portions residing in, any computer such as, but not limited to, a general purpose personal computer. Therefore, computer 12 of FIG. 3 may be representative of any computer in which the control system 14 resides or partially resides.

Generally, in terms of hardware architecture, as shown in FIG. 3, the computer 12 includes a processor 16, memory 18, and one or more input and/or output (I/O) devices 20 (or peripherals) that are communicatively coupled via a local interface 22. The local interface 22 can be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 is a hardware device for executing software, particularly software stored in memory 18. The processor 16 can be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×8 or Pentium series microprocessor from Intel Corporation, a PowerPC microprocessor from IBM, a Sparc microprocessor from Sun Microsystems, Inc., a 8xxx series microprocessor from Motorola Corporation, an Intel Xeon (Single and Dual Core), or an Intel Xeon Processor MP (Single and Dual Core).

The memory 18 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 18 may incorporate electronic, magnetic, optical, and/or other types of storage media. The memory 18 can have a distributed architecture where various components are situated remote from one another, but can be accessed by the processor 16. The software in memory 18 may include one or more separate programs, each of which comprises an ordered listing of executable instructions for implementing logical functions. In the example of FIG. 3, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation, including but not limited to, Microsoft Vista and Windows Mobile Client; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 essentially controls the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 can be written as (a) an object oriented programming language, which has classes of data and methods, or (b) a procedure programming language, which has routines, subroutines, and/or functions, for example but not limited to, C, C++, C# (C Sharp), Pascal, Basic, Fortran, Cobol, Perl, Java, Ada, and PHP. In one embodiment, the control system 14 is written in C++. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (a modem for accessing another device, system, or network), a radio frequency (RF) or other transceiver, a telephonic interface, a bridge, a router, etc.

If the computer 12 is a PC, workstation, PDA, or the like, the software in the memory 18 may further include a basic input output system (BIOS) (not shown in FIG. 3). The BIOS is a set of software routines that initialize and test hardware at startup, start the O/S 24, and support the transfer of data among the hardware devices. The BIOS is stored in ROM so that the BIOS can be executed when the computer 12 is activated. When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 3, it should be noted that the control system 14 can be stored on any computer readable medium for use by or in connection with any computer related system or method. In the context of this document, a "computer-readable medium" can be any medium that can store, communicate, propagate, or transport the program for use by or in connection with the instruction execution system, apparatus, or device. The computer readable medium can be for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). The control system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the control system 14 is implemented in hardware, the control system 14 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
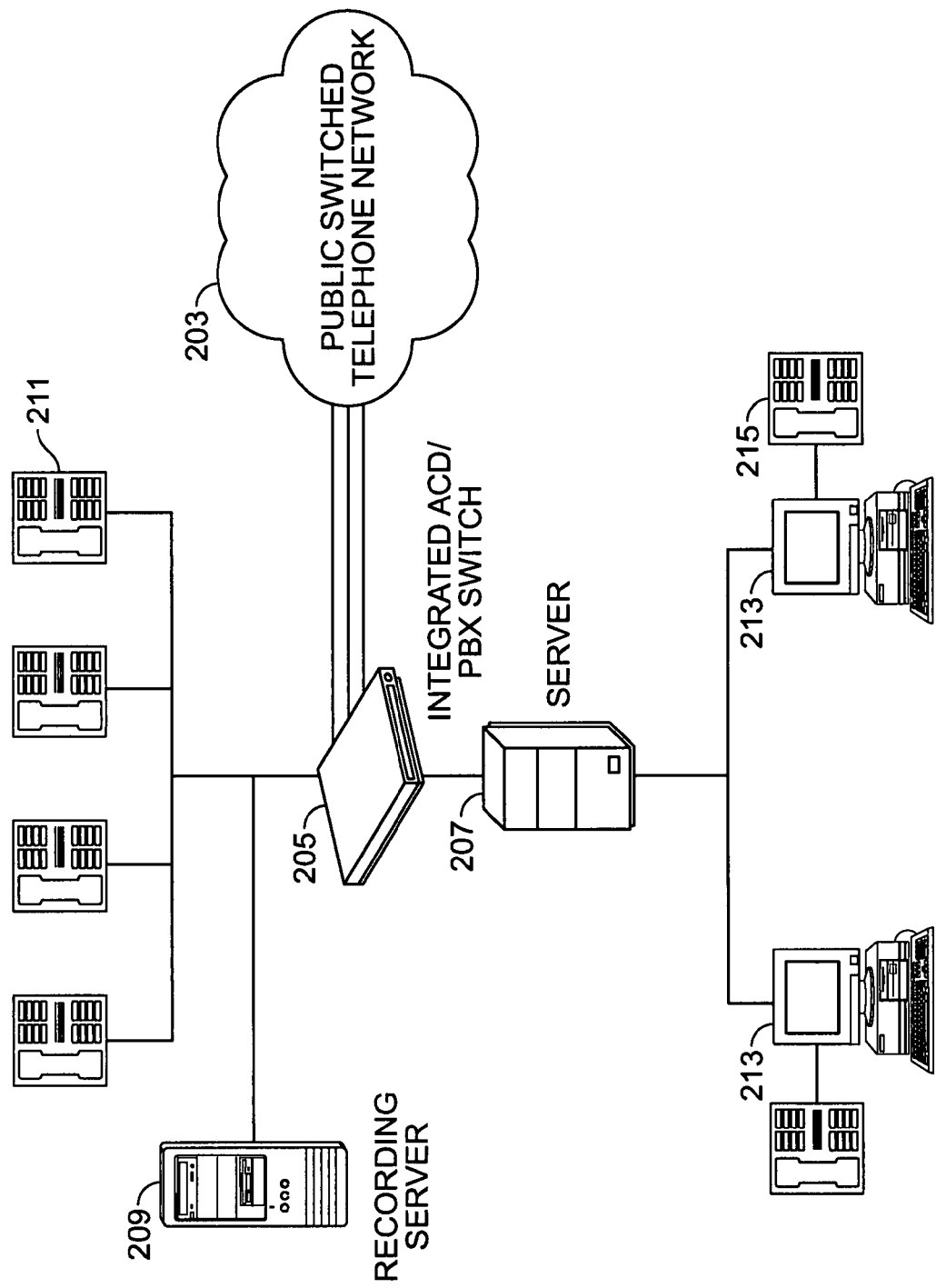
FIG. 2 is a block diagram of the architecture for a telephonic communication system according to the present invention.

As may be seen in FIG. 2, a customer sending a telephonic signal may access a contact center 10 through the public switched telephone network (PSTN) 203. An automatic call distribution system (PBX/ACD) 205 directs the communication to one of a plurality of CSR work stations 213. Each CSR work station 213 includes, for example, a computer 213 and a telephone 215. Alternatively, the telephonic signal can be distributed through a private branch exchange (PBX), having a public switched telephone network (PSTN) 203 connected to the PBX through a PBX switch 205. The PBX switch 205 provides an interface between the PSTN 203 and a local network. Preferably, the interface is controlled by software stored on a telephony server 207 coupled to the PBX switch 205. The PBX switch 205, using interface software, connects trunk and line station interfaces of the public switch telephone network 203 to stations of a local network or other peripheral devices contemplated by one skilled in the art. Further, in another embodiment, the PBX switch may be integrated with telephony server 207. The stations may include various types of communication devices connected to the network, including the telephony server 207, a recording server 209, telephone stations 211, and client personal computers 213 equipped with telephone stations 214. The local network may further include fax machines and modems and other devices.

According to the present invention, CTI is provided. In a preferred embodiment discussed herein, CTI resides on a telephony server 207. However, it will be understood by those skilled in the art that CTI can reside on its own server or at other hardware described herein. Generally, in terms of hardware architecture, the telephony server 207 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation. It will be understood that the telephony server may include standard CTI technology, such as that sold by Cisco, Avaya, Genesys or other provider of CTI technology.

According to one embodiment, the telephony server 207 also incorporates PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Figure 4:
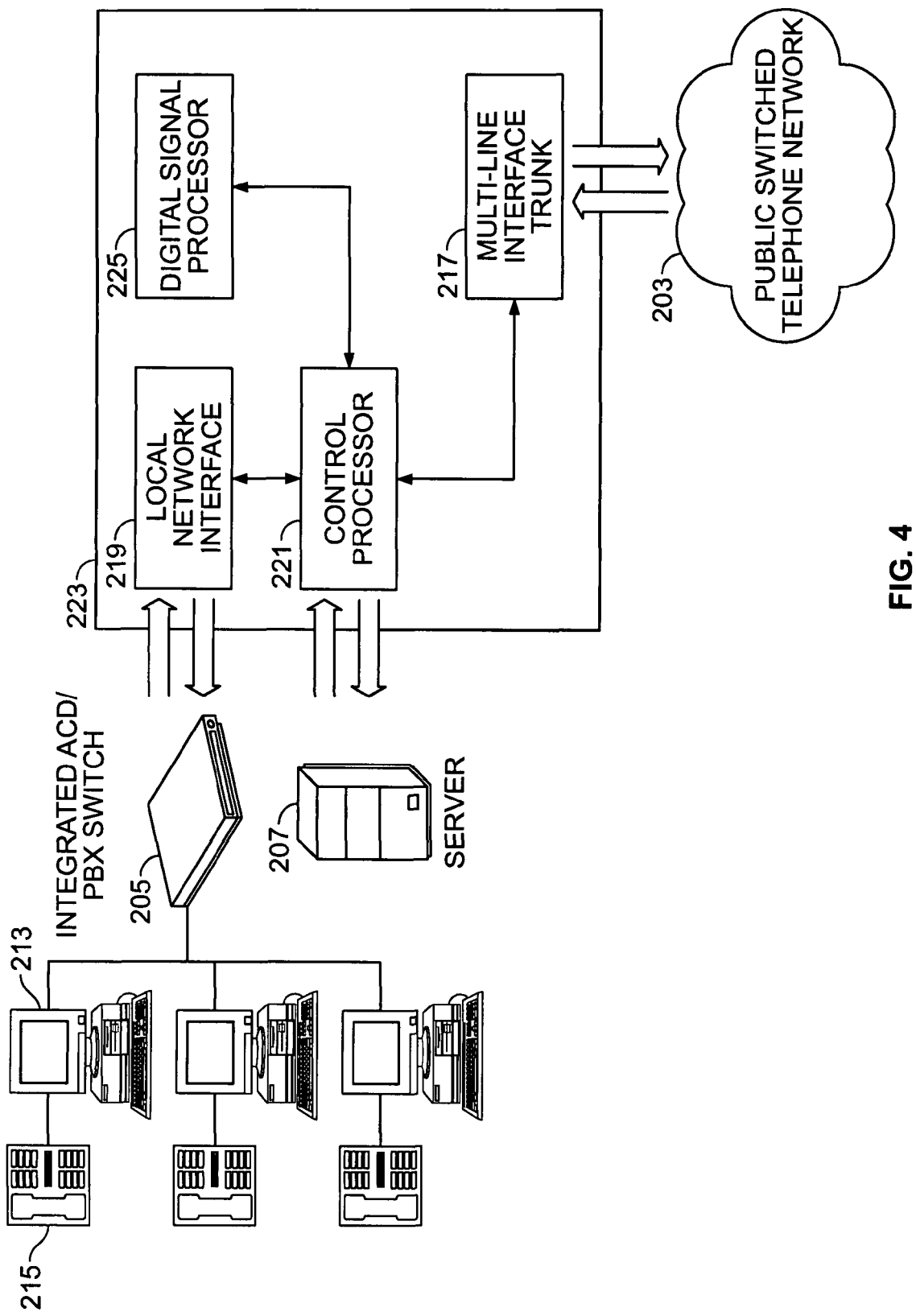
FIG. 4 is a block diagram of a telephonic communication system with a multi-port PSTN module according to the present invention.

Referring to FIG. 4, in one embodiment, the telephony server 207 is equipped with multi-port PSTN module 223 having circuitry and software to implement a trunk interface 217 and a local network interface 219. The PSTN module 223 comprises a control processor 221 to manage the transmission and reception of network messages between the PBX switch 205 and the telephony server 207. The control processor 221 is also capable of directing network messages between the PBX switch 205, the local network interface 219, the telephony network server 207, and the trunk interface 217. In the one embodiment, the local network uses Transmission Control Protocol/Internet Protocol (TCP/IP), also known as Voice Over IP (VoIP). The network messages may contain computer data, telephony transmission supervision, signaling and various media streams, such as audio data and video data. The control processor 221 directs network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and the local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 manages real-time telephony event handling pertaining to the telephone trunk line interfaces, including managing the efficient use of digital signal processor resources for the detection of caller ID, DTMF, call progress and other conventional forms of signaling found on trunk lines. The control processor 221 also manages the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 includes conventional circuitry to interface with the local network or VoIP. The specific circuitry is dependent on the signal protocol utilized in the local network. In one embodiment, the local network may be a local area network (LAN) utilizing IP telephony. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local network to the trunk interface 217. It is noted that the digital signal processor 225 may be integrated with the control processor 221 on a single microprocessor.

The digital signal processor 225 can include a coder/decoder (CODEC) connected to the control processor 221. The CODEC may be a type TCM29c13 integrated circuit made by Texas Instruments, Inc. In one embodiment, the digital signal processor 225 receives an analog or digital voice signal from a station within the network or from the trunk lines of the PSTN 203. The CODEC converts the analog voice signal into a digital form, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet contains a source address, a destination address, and audio data. The source address identifies the location the audio data originated from and the destination address identifies the location the audio data is to be sent.

The system permits bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream is restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Siemens AG, NEC, Nortel, Toshiba, Fujitsu, Vodavi, Mitel, Ericsson, Panasonic, InterTel or Cisco. In contrast, a virtual PBX has equipment located at a central telephone service provider and delivers the PBX as a service over the PSTN 203.

As illustrated in FIG. 2, the system includes a recording server 209 for recording network messages transmitted within the system. As shown in FIG. 2, the recording server 209 may be connected to a port on the local network or to the PSTN trunk line. The recording server 209 is also communicably coupled to the telephony server 207. The recording server 209 includes a control system software, namely, recording software. The recording software of the invention can be implemented in software (e.g., firmware), hardware, or a combination thereof. In a currently contemplated preferred embodiment, the recording software is implemented in software, as an executable program, and is executed by one or more special or general purpose digital computer(s). The recording software may reside in, or have portions residing in, any computer such as, but not limited to, a general purpose personal computer.

Generally, hardware architecture is the same as that discussed above and shown in FIG. 3. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

The recording server 209 incorporates recording software for recording, in addition to other inputs associated with an interaction, a telephone signal based on the source address and/or destination address of the signal. The method utilized by the recording server 209 depends on the communication protocol utilized on the communication lines to which the recording server 209 is coupled. In the communication system contemplated by the present invention, the signal carrying audio data of a communication between at least two users may be an analog signal or a digital signal in the form of a network message. In one embodiment, the signal is an audio data transmitted according to a signaling protocol, for example the H.323 protocol described above.

Figure 5:
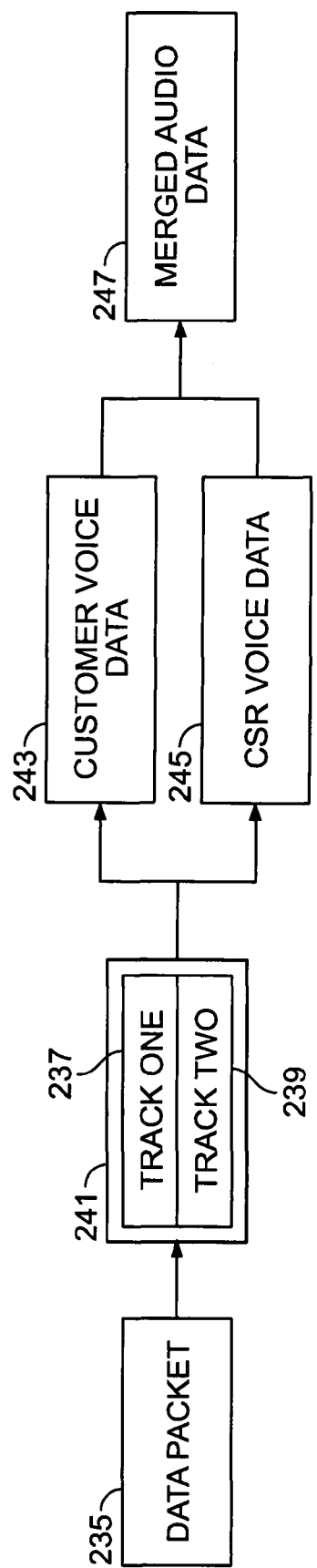
FIG. 5 is a block diagram illustrating the process of recording and separating voice data in accordance with the present invention.
Figure 6:
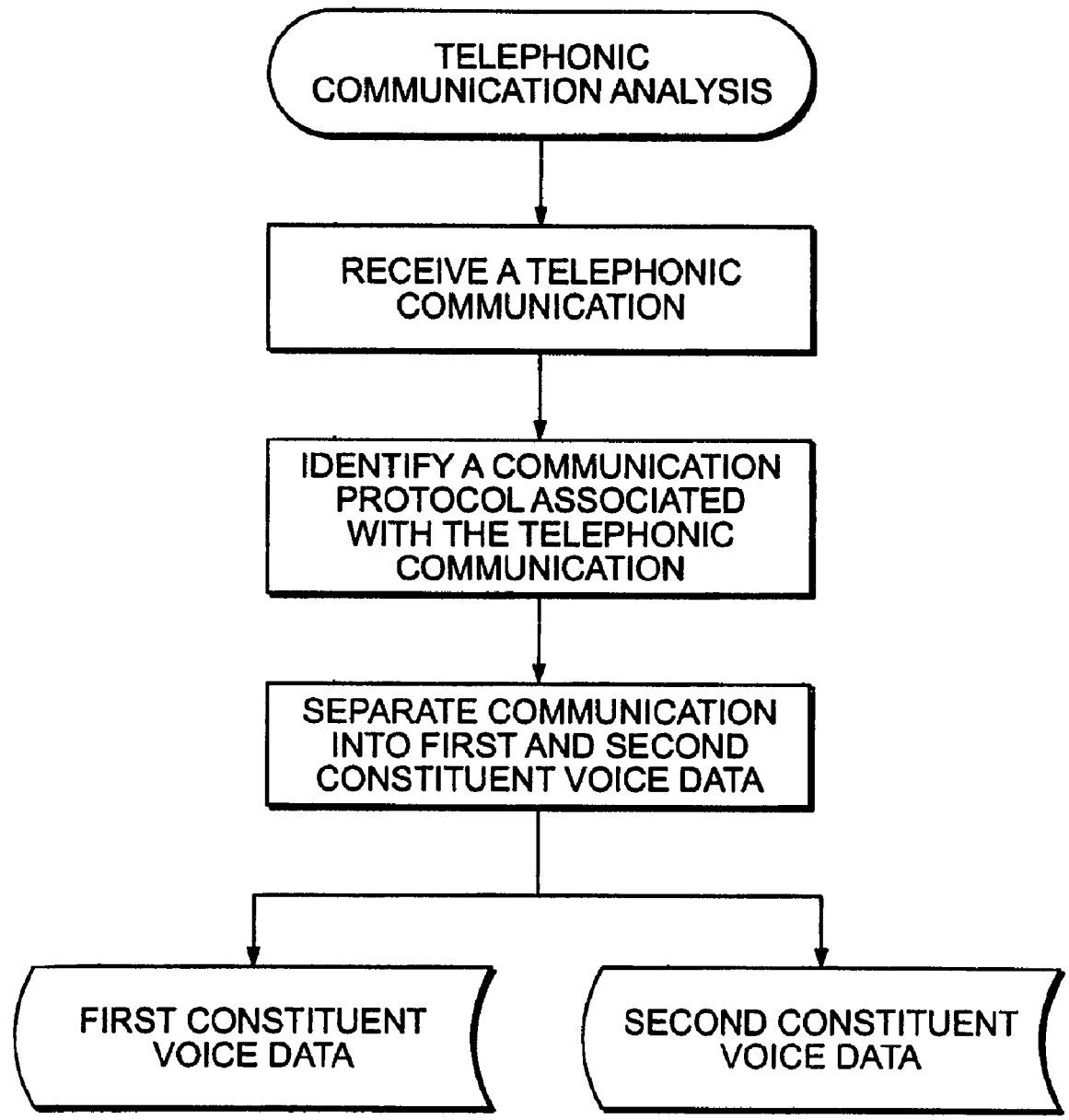
FIG. 6 is a flow chart illustrating the process of separating a telephonic communication in accordance with the present invention.
Figure 7:
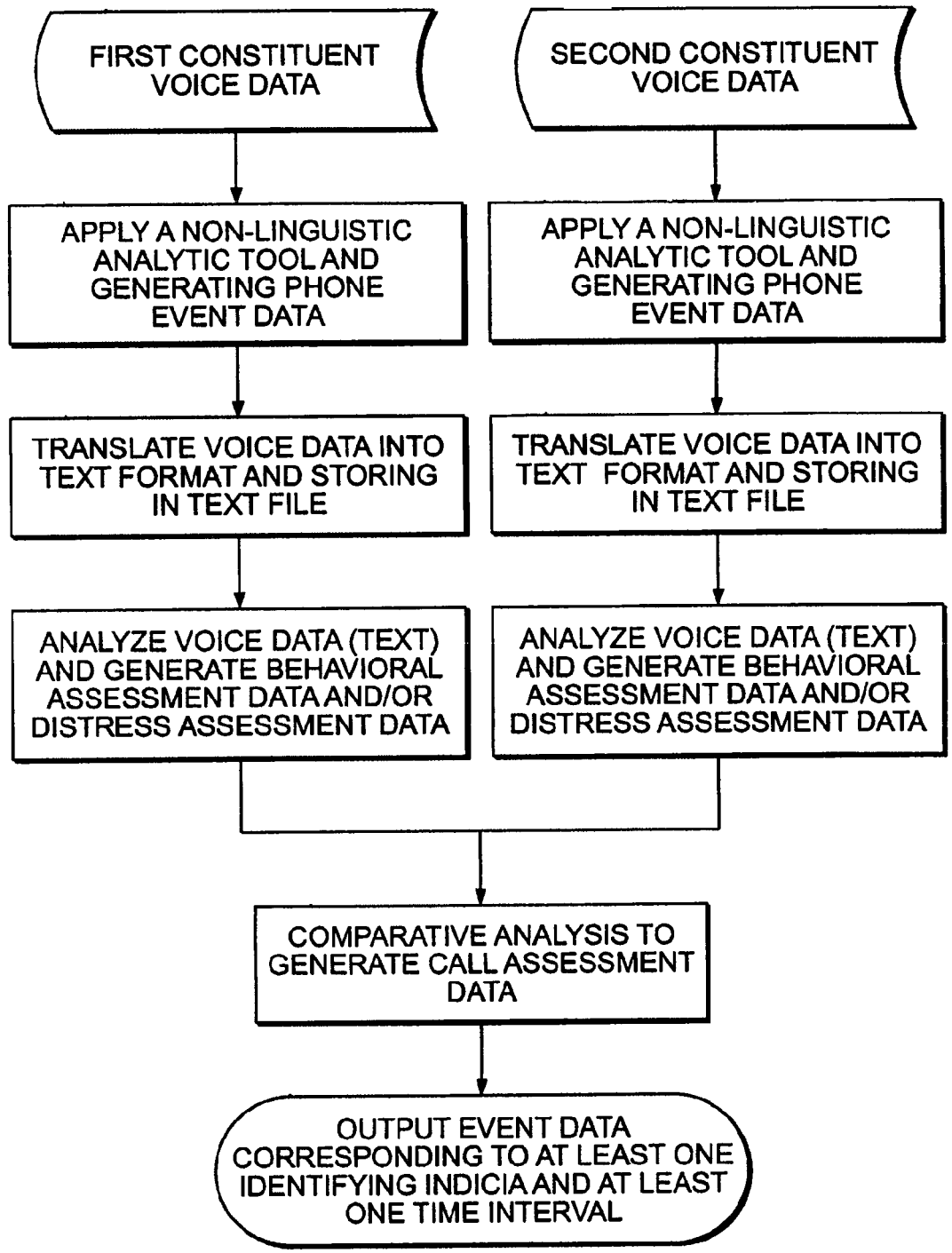
FIG. 7 is a flow chart illustrating the process of analyzing separated constituent voice data of a telephonic communication in accordance with the present invention.
Figure 8:
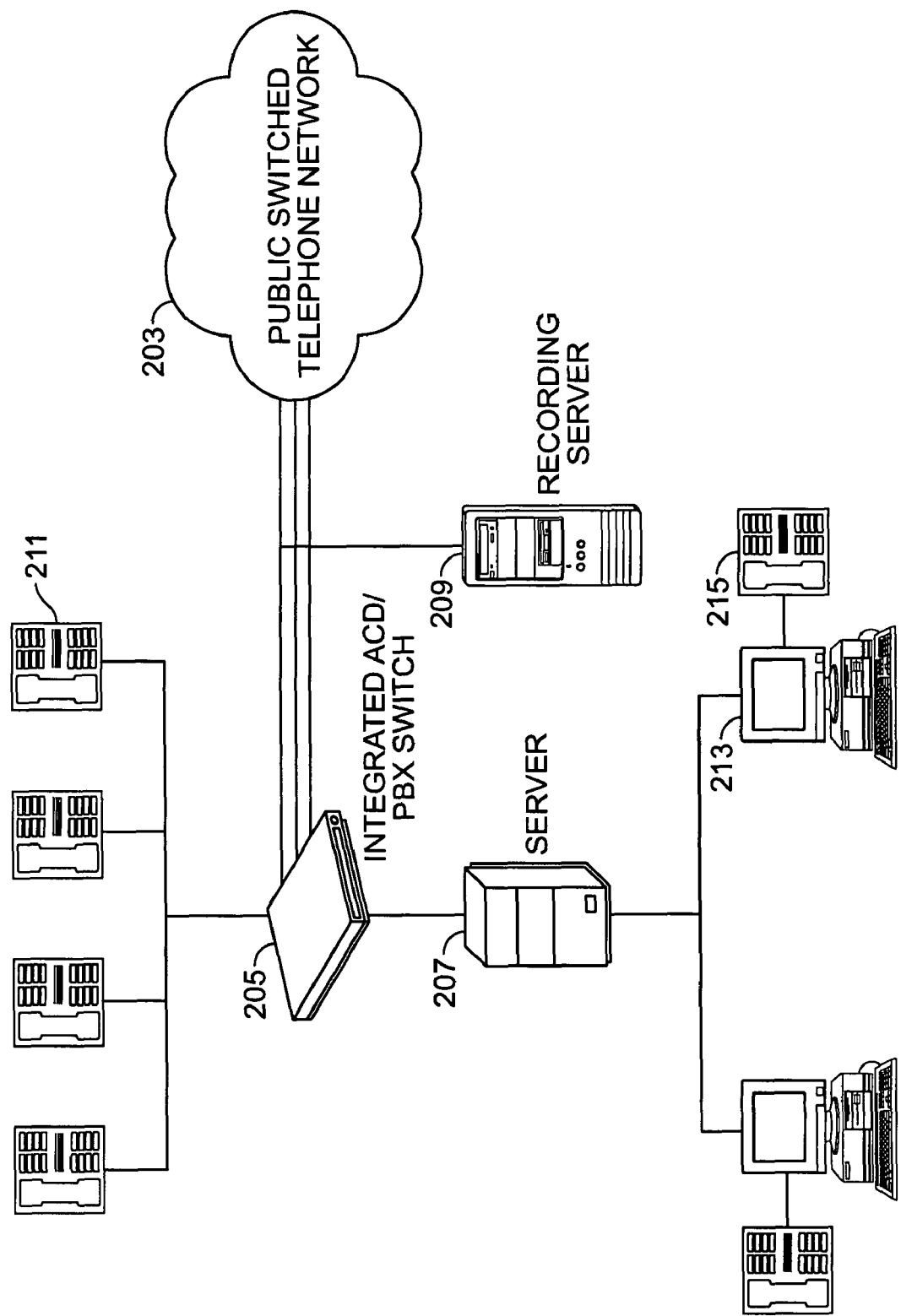
FIG. 8 is a flow chart illustrating the process of analyzing separated constituent voice data of a telephonic communication in accordance with the present invention.
Figure 9:
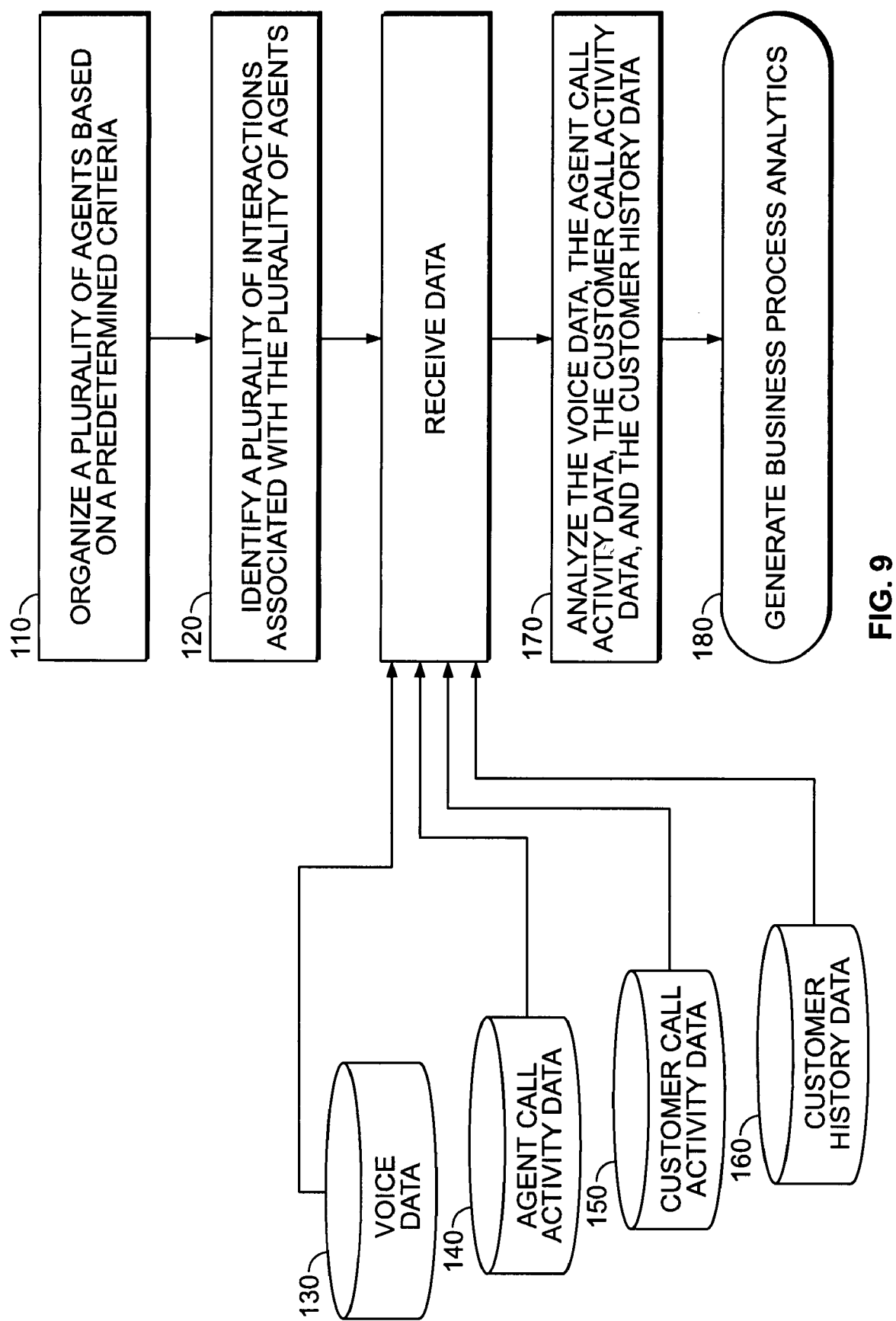
FIG. 9 is a flow chart illustrating a system for generating business process analytics according to the present invention.
Figure 10:
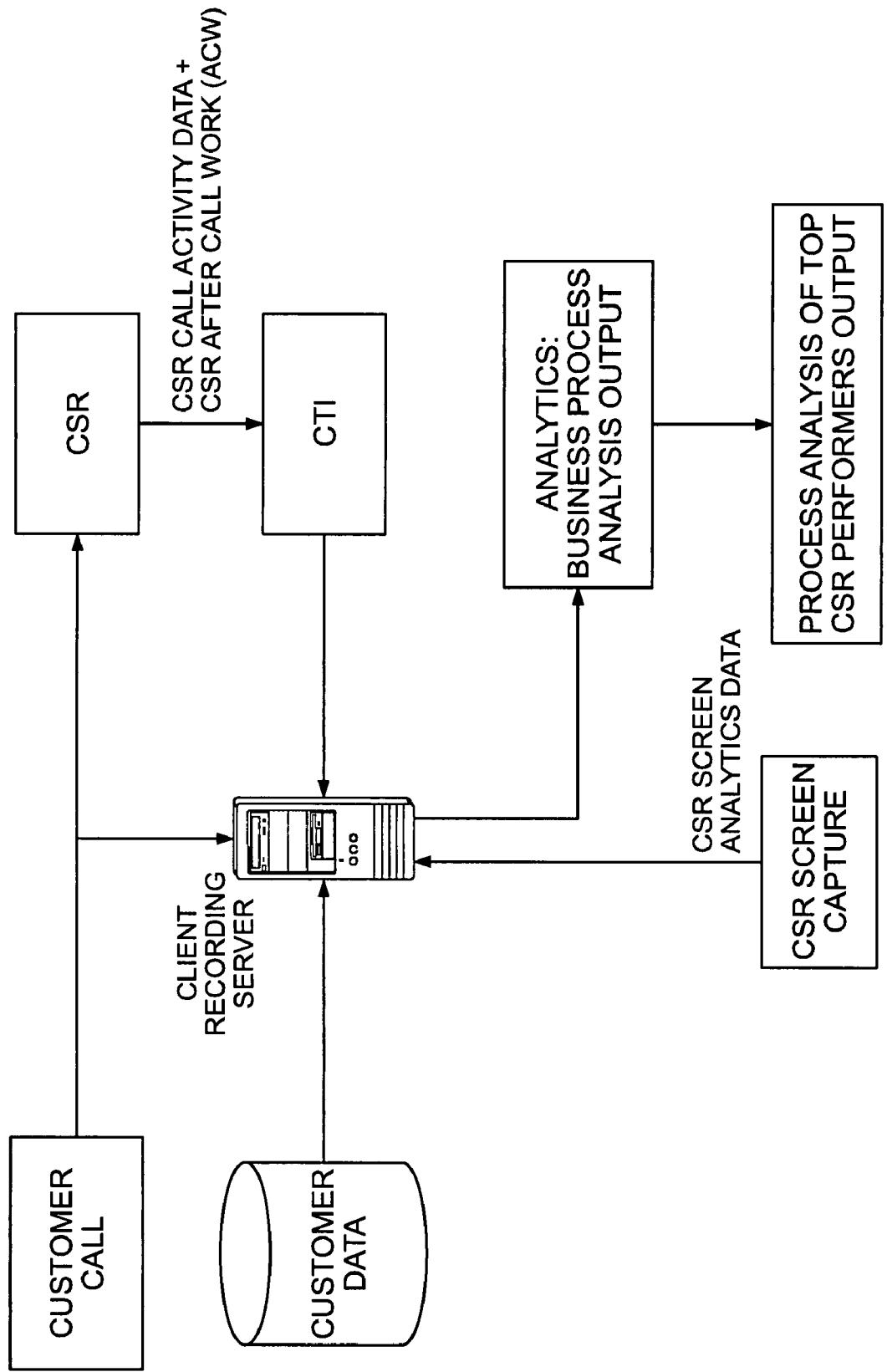
FIG. 10 is a flow chart illustrating a system for generating business process analytics according to the present invention.

One example of a recording method that may be used in the present system 200 is illustrated in FIG. 5 and described herein. In the embodiment of FIG. 5, when an outside customer reaches the system through the multi-line interface trunk 217, their voice signal is digitized (if needed), and converted into digital data packets 235 according to the communication protocol utilized on the local network of the system. The data packet 235 comprises a source address identifying the address of the outside customer, a destination address identifying the address of the contact center CSR, and first constituent audio data comprising at least a portion of the outside customer's voice. The data packet 235 can further comprise routing data identifying how the data packet 235 should be routed through the system and other relevant data. Once the data packet 235 is created, the data packet 235 is sent to the appropriate destination on the local network, such as to a contact center CSR, through the local network interface 219. The PBX and/or an automatic call distributor (ACD) can determine the initial communication setup, such as the connection state, impedance matching, and echo cancellation, according to predetermined criteria.

Similar to the process described above, when the contact center CSR speaks, their voice is digitized (if needed) and converted into digital data packet 235 according to the communication protocol utilized on the local network. The data packet 235 comprises a source address identifying the address of the contact center CSR, a destination address identifying the address of the outside customer, and second constituent audio data comprising at least a portion of the contact center CSR's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211, 215 or an interface trunk 217 of the PSTN module 223, or a digital interface such as a T1 line or ISDN. In addition, digital data can be converted to analog data for transmission through the PSTN 203.

The recording server 209 receives either a data packet 235 comprising: the source address identifying the address of the outside customer, a destination address identifying the address of the contact center CSR, and the first constituent audio data comprising at least a portion of the outside customer's voice; or a data packet 235 comprising a source address identifying the address of the contact center CSR, a destination address identifying the address of the outside customer, and second constituent audio data comprising at least a portion of the CSR's voice. It is understood by one of ordinary skill in the art that the recording server 209 is programmed to identify the communication protocol utilized by the local network and extract the audio data within the data packet 235. In one embodiment, the recording server 209 can automatically identify the utilized communication protocol from a plurality of communication protocols. The plurality of communication protocols can be stored in local memory or accessed from a remote database.

The recording server 209 comprises recording software to record the interaction between the customer and the CSR in a single data file in a stereo format. The first data file 241 has at least a first audio track 237 and a second audio track 239. As shown in FIG. 5, once a telephone connection is established between a customer and a CSR, the recording software creates a first data file 241 to record the interaction between the customer and the CSR. It is contemplated that the entire interaction or a portion of the interaction can be recorded.

Upon receiving the data packet 235, the recording server 209 determines whether to record the audio data contained in the data packet 235 in either the first audio track 237 or the second audio track 239 of the first data file 241 as determined by the source address, destination address, and/or the audio data contained within the received data packet 235. Alternatively, two first data files can be created, wherein the first audio track is recorded to the one of the first data file and the second audio track is recorded to the second first data file. In one embodiment, if the data packet 235 comprises a source address identifying the address of the outside customer, a destination address identifying the address of the outside customer, and first constituent audio data, the first constituent audio data is recorded on the first audio track 237 of the first data file 241. Similarly, if the data packet 235 comprises a source address identifying the address of the CSR, a destination address identifying the address of the CSR, and second constituent audio data, the second constituent audio data is recorded on the second audio track 239 of the first data file 241. It should be noted that the first and second constituent audio data can be a digital or analog audio waveform or a textual translation of the digital or analog waveform. The recording process is repeated until the communication link between the outside customer and contact center CSR is terminated.

As noted above, the recording server 209 can be connected to the trunk lines of the PSTN 203 as seen in FIG. 2. The PSTN 203 can utilize a different protocol and therefore, the recording server 209 is configured to identify the communication protocol utilized by the PSTN 203, recognize the source and destination address of a signal and extract the audio data from the PSTN 203. The recording server 209 is programmed in a manner as known to one of ordinary skill in the art.

Once the communication link is terminated, the recording server 209 ends the recording session and stores the single data file having the recorded communication session in memory. After the first data file is stored in memory, the recording server 209 can extract either or both of the first constituent audio data from the first audio track of the first data file or the second constituent audio data from the second audio track of the first data file. In one embodiment, the first constituent audio data extracted from the first audio track is stored in a first constituent data file 243. Similarly, the second constituent audio data extracted from the second audio track can be stored in a second constituent data file 245. The first and second constituent data files 243, 245 can be compressed before being stored in memory. The extracted data can be in the form of a digital or analog audio waveform or can be a textual translation of the first or second constituent audio data. It is contemplated that either or both of the first constituent data file 243 or the second constituent data file 245 can be further analyzed or processed. For example, among other processes and analysis, filtering techniques can be applied to the first constituent data file and/or the second constituent data file. Moreover, event data, such as silence periods or over-talking, can be identified through analysis techniques known to those skilled in the art.

Further, as illustrated in FIG. 5, the first constituent data file 243 and the second constituent data file 245 can be merged together into a single second data file 247. The first and second constituent data files can be merged in a stereo format where the first constituent audio data from the first constituent data file 243 is stored on a first audio track of the second data file 247 and the second constituent audio data from the second constituent data file 245 is stored on a second audio track of the second data file 247. Alternatively, the first and second constituent data files can be merged in a mono format where the first constituent audio data from the first constituent data file 243 and the second constituent audio data from the second constituent data file 245 are stored on a first audio track of the second data file 247. Additionally, the first and second constituent audio data can be merged into a document having a textual translation of the audio data. In such a case, identifiers can be associated with each of the merged first and second constituent audio data in order to associate the merged first constituent audio data with the outside caller, and associate the merged second constituent audio data with the contact center agent. The second data file 247 can be compressed before being stored in memory.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the customer's key pad, conversations with the CSR, and screens displayed by the CSR at his/her station during the transaction.

As shown in FIGS. 9-17, the present invention provides a method of aggregating various types of data associated with at least two of a plurality of interactions between a customer and an agent for the purpose of generating business process analytics. The method of aggregating data includes the step of organizing a plurality of agents based on a predetermined criteria 110. The method also includes the step of identifying a plurality of interactions associated with the plurality of agents in a range of the organized plurality of agents 120. The method also includes the step of receiving voice data associated with each of the identified interactions 130. The method also includes the step of receiving agent call activity data associated with each of the identified interactions. The agent call activity data can include one or more of the following data types: agent on-call activity data, agent after-call activity data, agent screen analytics and agent desktop recording data 140. The method also includes the step of receiving customer call activity data associated with each of the identified interactions 150. The method also includes the step of receiving customer history data corresponding to each customer of each of the identified interactions 160. The method also includes the step of analyzing the voice data, the agent call activity data, the customer call activity data, and the customer history data associated with each of the identified interactions 170. In addition, the method includes the step of generating business process analytics for the identified interactions 180. Generating the business process analytics includes the step of generating dissatisfaction data for each of the identified interactions based on the analyzed voice data, the agent call activity data, the customer call activity data, and the customer history data.

According to one embodiment, this method is implemented by a computer program. As discussed above, the computer program is preferably embodied on a computer readable storage medium adapted to control a computer and includes a plurality of instructions (e.g., code segments) for performing the task. The computer program, according to one embodiment of the invention, identifies at least two interactions from a group of at least two (i.e., a plurality) interactions between at least one customer and at least one agent for the purpose of generating business process analytics. For example, if business process analytics were being generated for a single contact center, then the program would identify at least two interactions received at the contact center. In such an instance, the identified interactions would include interactions between at least one of a group of agents and at least one of a group of customers. Alternatively, in this example, if business process analytics were being generated for a single customer, then the program would identify at least two interactions received for that customer. In such a case, the identified interactions would include interactions between at least one of a plurality of agents and only a single customer.

Figure 12:
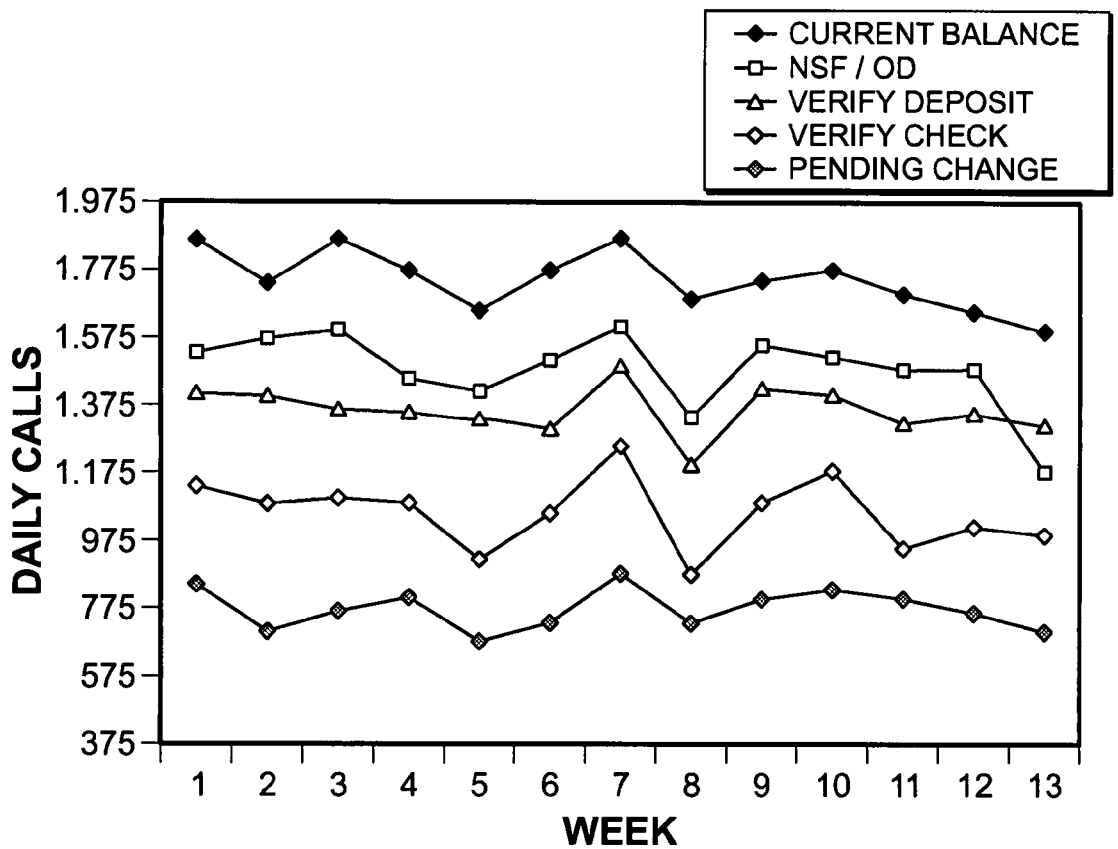
FIG. 12 is a graphical representation of generated business process analytics in accordance with the present invention.
Figure 13:
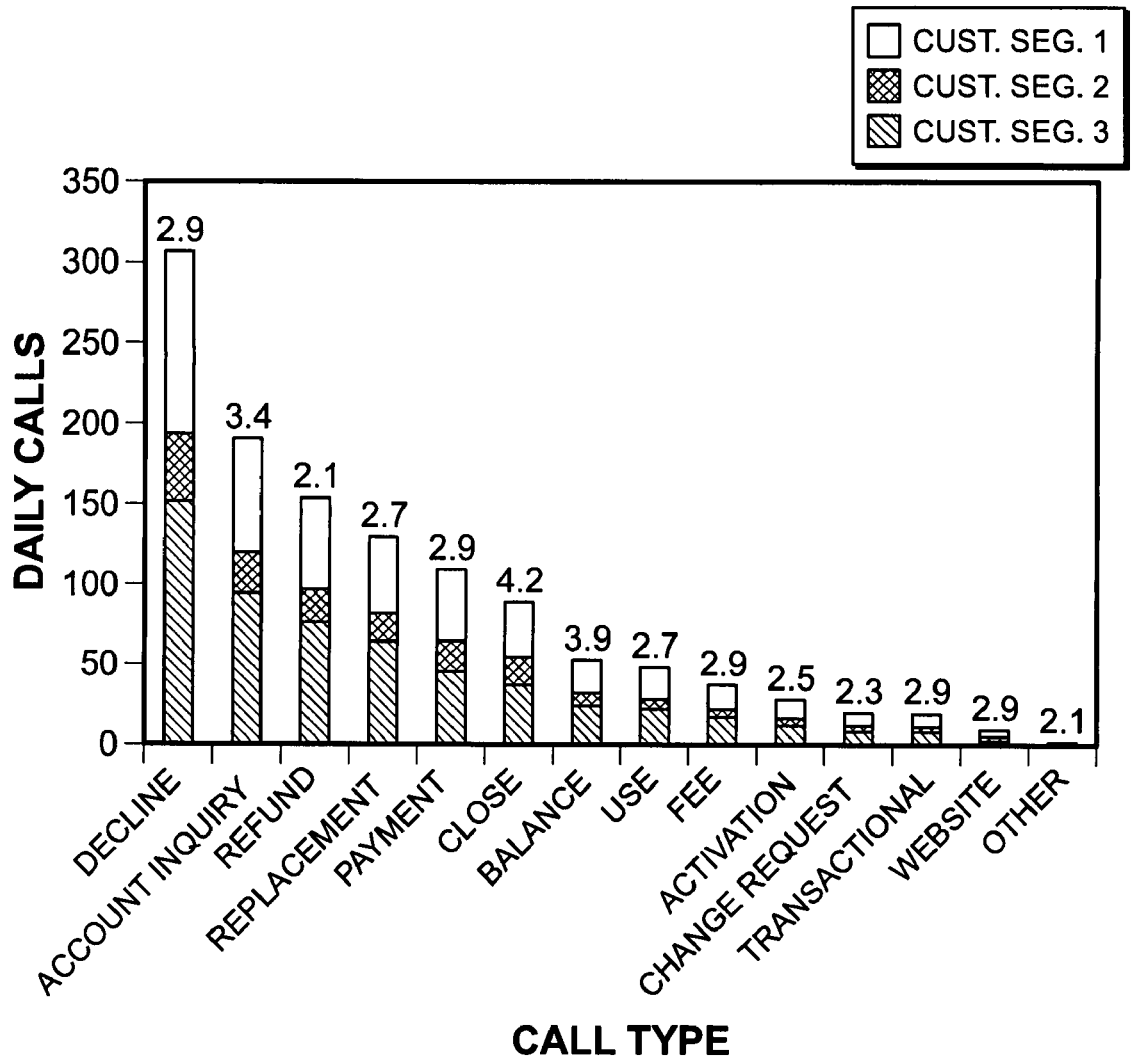
FIG. 13 is a graphical representation of generated business process analytics in accordance with the present invention.
Figure 15:
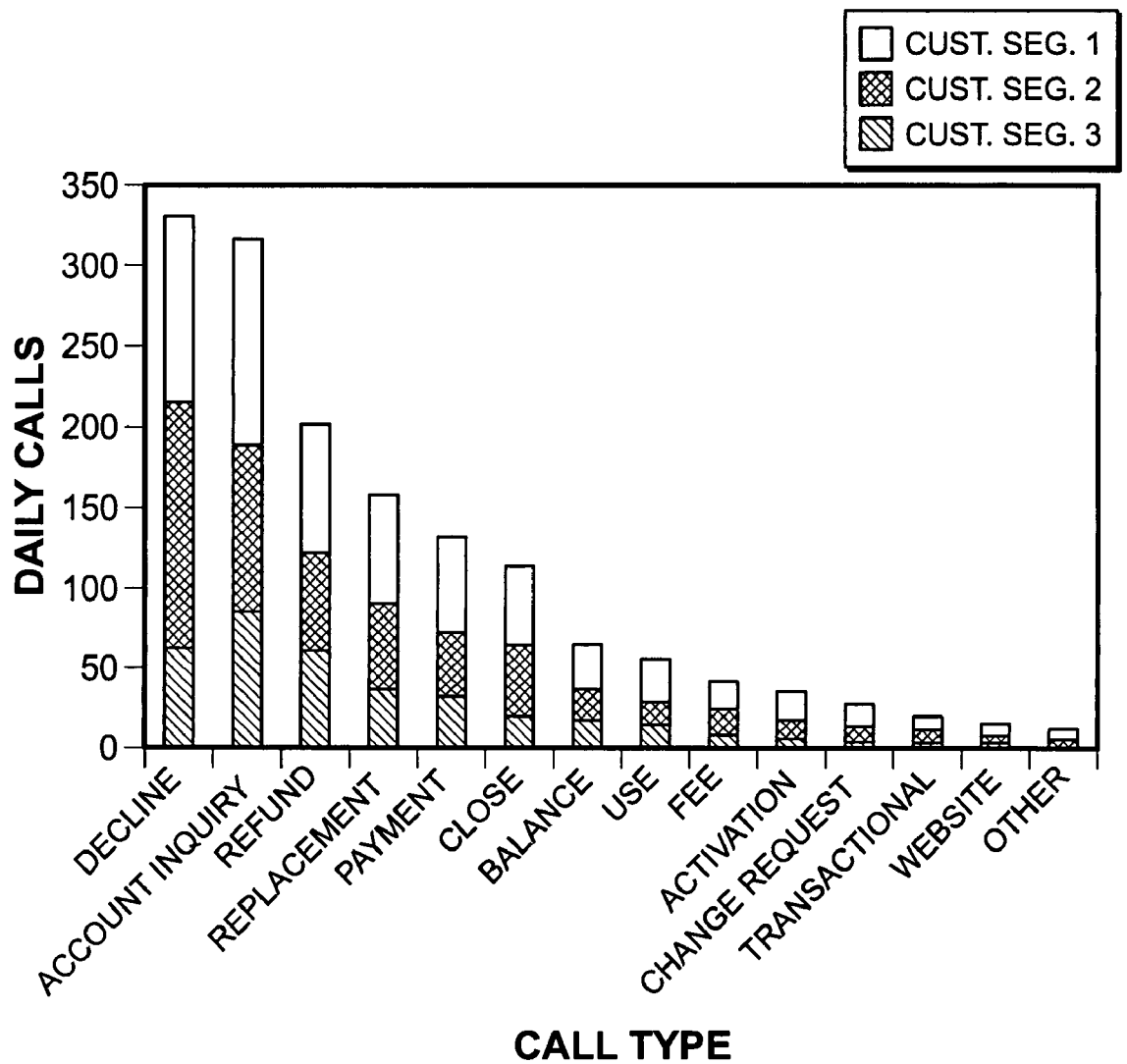
FIG. 15 is a graphical representation of generated business process analytics in accordance with the present invention.

It is contemplated that the interactions are identified based on the business process analytics sought to be generated. For example, as seen in FIGS. 9-17, business process analytics can be generated for many facets of a contact center. These facets include, but are not limited to: a plurality of customer segments (FIG. 11), a contact center's most frequent interaction types (FIG. 12), the interactions received by a contact center on a particular day (FIG. 13), a plurality of customer behavioral types (FIG. 14). These examples will be explained in greater detail further herein. It is understood, however, that in order to generate business process analytics for a particular facet of a contact center, at least two of a plurality of interactions will be identified that are associated with that particular facet of the contact center. Accordingly, as seen in FIG. 13, where business process analytics are being generated for interactions received on a particular day, the present invention will identify at least two interactions received that day to perform further analysis and to generate business process analytics.

One problem associated with prior methods is obtaining business process analytics that accurately reflect the inefficiencies of a contact center's particular business processes. Often prior methods provide business process analytics that are skewed because they do not reflect inefficiencies inherent in the contact center's business processes, rather the business process analytics reflect inefficiencies of the agents performing the business processes. Thus, there tends to be variability in the business process analytics depending on the particular agent implementing the business processes. In a preferred embodiment of the present invention, the variability of an agent's performance impacting the business process analytics can be neutralized by first organizing a plurality of agents based on a predetermined criteria. In addition, according to one preferred embodiment, a range of the organized plurality of agents in a selected and the interactions associated with the organized plurality of agents within the selected range is identified. Business process analytics are then generated for the identified plurality of interactions. According to one preferred embodiment of the present invention, the predetermined criteria for organizing the plurality of agents can be established by ranking agents according to a performance score as described in copending and commonly assigned U.S. patent application Ser. No. 11/365,432. The interactions associated with the agents receiving performance scores in the highest quartile are then identified and business process analytics are generated for those identified interactions. It is also contemplated by the present invention that the predetermined criteria for organizing agents, as well as the selected range of the organized plurality of agents for which the associated interactions are identified, may be established by any standard and selected for any range suitable for a given contact center or industry.

In one embodiment of the present invention, voice data, agent call activity data, customer call activity data, and customer history data from each of the identified interactions are received by a contact center and analyzed to generate business process analytics for the identified interactions. Each of the different types of data that can be received will be described in further detail herein.

According to the present invention, voice data associated with each of the identified interactions is received and separated into customer voice data and agent voice data. It will be understood that additional data may also be included in the interaction. The separated agent voice data and the separated customer voice data are then mined and analyzed. More particularly, the voice data can be analyzed by applying one or more of the following analytical models: a linguistic based psychological behavioral model, a distress based model, and a non-linguistic event analytical model. It is further contemplated that the identified interactions are recorded.

As shown in FIGS. 5-8, once the customer and agent voice data are separated one from the other, each of the separated customer and agent voice data can be independently mined and analyzed. It will be understood that "mining" as referenced herein is to be considered part of the process of analyzing the separated voice data of the customer and the agent. It is also contemplated by the present invention that the mining and behavioral analysis can be conducted on either or both of the separated voice data of the customer and the agent.

It is contemplated by the present invention that mining and analysis in accordance with the present invention can be applied directly to the voice data configured in audio format. Preferably, however, the voice data to be mined and analyzed is first translated into a text file. It will be understood by those of skill that the translation of audio to text and subsequent data mining may be accomplished by systems known in the art. For example, the method of the present invention may employ software such as that sold under the brand name Audio Mining SDK by Scansoft, Inc., or any other audio mining software suitable for such applications.

In one embodiment of the present invention, the separated customer voice data and the separated CSR voice data are mined for behavioral signifiers associated with a linguistic-based psychological behavioral model. In particular, the separated customer voice data and the separated agent voice data are searched for text-based keywords (i.e., behavioral signifiers) relevant to a predetermined psychological behavioral model. One preferred such psychological behavioral model and behavioral analysis is described in U.S. patent application Ser. No. 11/131,486, which is incorporated herein by reference.

The resultant behavioral signifiers 55 derived from the mining of the separated customer voice data and the separated CSR voice data may be used to evaluate qualities of a single communicant (e.g., the customer or CSR behavioral type, etc.) and to generate behavioral assessment data. For example, the behavioral assessment data can include customer reaction to a CSR based on the compatibility of a CSR's behavioral type and a customer's behavioral type, and CSR reaction to a customer based on the compatibility of a CSR's behavioral type and a customer's behavioral type. The results generated by analyzing the separated CSR voice data and the separated customer voice data through application of a psychological behavioral model to the separated customer voice data and the separated CSR voice data are stored in a database for subsequent analysis of the interaction, as well as to generate dissatisfaction data for further generating business process analytics.

The separated CSR voice data and separated customer voice data can also be analyzed by applying a distress based model. Preferably, a linguistic-based distress analysis is conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication. Preferably, the resultant voice distress data is also stored in the customer history database for subsequent analysis of the communication and to generate dissatisfaction data for generating business process analytics. In particular, the distress based model searches for word based distress signifiers to generate voice distress assessment data from the separated CSR and customer voice data. Voice distress assessment data can include, for example, data relating to instances in which a customer becomes upset during an interaction or dissatisfied with a CSR's response. Voice distress data can also include those identified instances in which a customer's issue remains unresolved.

The separated voice data of the customer and the CSR can also be analyzed by applying a non-linguistic event analysis that looks for non-linguistic phone events occurring during the course of an interaction to generate phone event assessment data. Phone event assessment data can include in whole, or in part, components of the call such as "dead air," overtalk, cross-sells, and call type. Preferably, the phone event assessment data is generated by analyzing non-linguistic information from both the separated voice data of the customer and the CSR, or from the subsequently generated audio file containing at least some of the remerged audio data of the original audio waveform. It is also contemplated that the phone event assessment data can be generated before the audio waveform is separated. The generated phone event assessment data can also be stored in a database for subsequent analysis and use in generating dissatisfaction data for generating business process analytics.

According to one embodiment of the present invention, agent call activity data associated with each of the identified interactions is received. It is contemplated that agent call activity data can include one or more of the following data sub-components: CSR on-call activity data, CSR after-call activity data, CSR screen analytics, or CSR desktop recording data.

In one preferred embodiment, the CSR on-call activity data can be, for example, the customer service representative's interaction with an IVR system, or data keyed through the CSR's keypad. The CSR on-call activity data can also include incremental data relating to the length of time the CSR put the customer on hold, the number of times the CSR put the customer on hold, the number of transfers associated with the call, or the entire time spent on the call. It will be understood by one of skill in the art, that the CSR on-call activity data can be one or more of these activities or occurrences. It will also be understood that on-call activity data can include other data generated during an interaction.

After an interaction between a CSR and a customer, it is also commonly understood that a CSR may engage in activity relating to the terminated interaction. According to the present invention, data collected from after a call is terminated through the CSR's completion of the interaction is collectively CSR after-call activity. The CSR after-call activity can include, but is not limited to, notes the CSR makes about the interaction (including the time to prepare such notes), time CSR spent completing the interaction, and follow-up activity with the customer.

In addition, one embodiment of the present invention contemplates receiving screen analytics and desktop recording data associated with the activity of the CSR during, and after, the interaction. The screen analytics can include, but is not limited to, the CSR's mouse movements, the screens displayed by the CSR at the CSR's terminal, and desktop data reviewed and entered by the CSR. It is understood that the screen analytics for a CSR may be captured by a device provided by an original equipment manufacturer ("OEM") such as Iontas or any other known providers of screen capture technology. It is further contemplated that desktop recording software produces a video recording of a CSR's desktop activity. Typically, the recording will capture, in a bitmap image or video, all or a desired portion of a CSR's desktop activity during and after the interaction. The image or video may be played back at a later time for further analysis. Examples of suitable commercially available desktop recorders include, but are not limited to, recorders offered by Nice, Funk Systems, and eTalk.

The computer program also receives customer call activity data 30. According to one embodiment of the present invention, the customer call activity data 30 can be a customer's interaction with an IVR system or other data keyed through the caller's key pad. It will be understood that customer call activity data may be generated and transmitted as discussed herein, or by another means known to those of ordinary skill.

According to the present invention, the computer program also receives customer history data corresponding to each customer of each of the identified interactions, preferably from a customer history database. In one embodiment, the customer history database is configured to store customer information associated with one or more customers. For example, the customer history database may include information relating to a customer's gender, race, age, income, education, customer tenure, customer spending and behavioral type. It will be understood that the data included in the customer history database is not limited to the information described herein, but may include any customer history information regarding a customer's identity. It will also be understood that the customer history database is preferably a relational database. The customer history database can be housed on a common server or a server separate from that on which the recording software is stored.

According to the present invention, voice data, agent call activity data, customer call activity data, and customer history data associated with each of the identified interactions are aggregated and analyzed for each of the identified interactions. The voice data can include: behavioral assessment data, voice distress assessment data, and/or phone event assessment data. Preferably, the aggregated voice data, the agent call activity data, the customer call activity data, and the customer history data are comparatively analyzed to generate dissatisfaction data for a given interaction and to further generate business process analytics as will be explained further herein.

FIGS. 10-17 illustrates various embodiments of this invention for generating business process analytics, which can be displayed through a graphical user interface ("GUI"). It is contemplated that the generated business process analytics can be used to help a client analyze its business process and to optimize and improve these processes.

In one embodiment of the present invention, the step of generating business process analytics includes generating dissatisfaction data for each of the identified interactions. The dissatisfaction data is generated based on the analyzed voice data, the agent call activity data, the customer call activity data and the customer history data. It is understood that dissatisfaction data represents data aggregated from the analyzed voice data, the agent call activity data, the customer call activity data, and the customer history data, to assess the inadequacy or shortcomings of a business process. Preferably, the generated business process analytics will include the dissatisfactory data organized in a meaningful way that will reveal to the contact center with particularity the exact deficiencies in the contact center's business processes.

According to the present invention, it is contemplated that a contact center's business processes can be identified by the types of interactions received at the contact center. The types of interactions will reflect the purpose for initiating the interaction. It is contemplated that each of the identified interactions can be categorized into one of a plurality of business processes based on one or more of the following: the analyzed voice data, the agent call activity data, the customer call activity data, and the customer history data. As seen in FIG. 16, the identified interactions are categorized based on the interaction type. For example, FIG. 16 illustrates generating business process analytics for each interaction type received by a bank. The interaction types include: current balance, NSF/OD, verify deposit, verify check, pending charge, transfer funds, bank card, on-line inquiry, fees, account maintenance, branch information. As shown in FIGS. 12-13, the identified interactions can be further grouped by the frequency in which a contact center receives a particular interaction type (FIG. 12), by interactions types received by a contact center for a particular time period (FIG. 13), or by other organizational criteria known to one skilled in the art. In particular, FIG. 12 illustrates generating business process analytics for the most frequent interaction types and FIG. 13 illustrates generating business process analytics for all the interaction types received by a client for a particular day.

In a preferred embodiment of the invention, the dissatisfaction data generated for a contact center's business processes includes identifying one or more distress events occurring during each of the identified interactions. It is contemplated that a distress event is defined as any event or occurrence during each of the identified interactions that prevents the optimum operation of a business process. It is further understood that different types of distress events may occur during an interaction and that the different distress event types can be defined according to a particular contact center's needs. The voice data, the agent call activity data, the customer call activity data, and the customer history data, for each of the identified interactions, may then be analyzed for instances of the types of distress events that are defined by the contact center's needs.

Although distress event types may be customized to an individual contact center's needs, it is understood that distress event types can also be defined by distress event types common to an industry, or common to contact centers in general. For example, distress event types can include, but are not limited to:

| Distress Event Types: |
|---|
| Non-interaction time |
| Transfers |
| Holds |
| Slow response or handling of an interaction |
| Inappropriate response by an agent |
| Contacting a supervisor during an interaction |
| Non-productive use of communication time (e.g., don't achieve a sale, unable to resolve customer problem, miss opportunity to attempt a cross sale) |
| Instances during the interaction where a customer became upset/dissatisfied |
| Issue remains unresolved at the end of the interaction |
| No follow-up with the customer |
| Poor after-call notes |

It will be understood that these categories are non-exhaustive, and that distress categories can include any other category that impedes the optimum operation of a business process.

According to one embodiment of the present invention, generating dissatisfaction data further includes measuring each distress event occurring during each identified interaction according to a predetermined distress event scale. The predetermined distress event scale is typically reflective of a particular contact center's needs. However, it will be understood that the distress event scale may be dictated by industry, by government or other regulations or standards. Alternatively, the distress event scale may be dictated by other criteria known to one of ordinary skill in the art. In addition, a score is generated for each of the identified interactions based on combining the measured distress events occurring during each of the identified interactions. The score is then compared against a threshold score, which can be established by the contact center, the industry, or in any manner familiar to one of ordinary skill in the art. If the score for an identified interaction exceeds (or falls below) the threshold score, then the interaction is regarded as a dissatisfactory interaction.

According to one embodiment of the present invention, business process analytics can comprise incrementally registering distress events occurring during the identified interactions as shown in FIG. 14. In the example shown in FIG. 14, the number of distress events occurring during each interaction on a daily basis is compared with a customer's behavioral type. Tracking the number of distress events per interaction for each customer behavioral type, helps to extrapolate data identifying precisely which customer types are most dissatisfied with particular business processes. For example, a business process may work well for certain behavioral types, but cause great dissatisfaction for other behavioral types. Thus, business process analytics that identify which behavioral types experience the most distress events during a particular type of interaction, allow a contact center to modify its business processes accordingly. It is contemplated by the present invention that single distress events or an aggregate of distress events occurring during an identified interaction can be tracked. Alternatively, distress events occurring during the identified interaction can be separated and counted according to their respective distress event types.

In addition, it is contemplated that according to one embodiment of the present invention, business process analytics can comprise an aggregation of generated dissatisfaction data associated with each of the identified interactions relative to one of a plurality of business processes identified. Referring again to FIG. 16, a graphical representation of one application of the present invention is illustrated in which interaction types represent particular business processes. The dissatisfaction data generated for the business processes in FIG. 16, includes data generated from tracking two types of distress events: non-interaction time and transfers. The system then tallies the number of calls that received a non-satisfactory score for these two particular distress event types. Further, an average non-interaction time and transfer time is calculated for each interaction type.

According to another embodiment of the present invention shown in FIG. 12, a graphical representation illustrates business process analytics generated for what have been determined to be the top interaction types of a predetermined group of interactions (or the interactions types most frequently received). As shown in FIG. 12, the top interaction types include: current balance, NSF/OD, verify deposit, verify check, and pending charge. The number of interactions that received a non-satisfactory score, for each of the top interaction types, is plotted each week. Business process analytics comprising generated dissatisfaction data organized by top interaction types enables one to view at a glance the dissatisfaction trend by top interaction types.

In another embodiment of the current invention, business process analytics can be generated for particular customers. Often, it is desirable to know whether a particular business process is satisfactory to particular segments of a contact center's customers. The customers of the identified interactions may be organized into a plurality of segments based on sharing one or more customer history data characteristic. For example, a customer segment may comprise customers who share the same customer spend level, customer tenure, or behavioral type. Business process analytics comprising generated dissatisfaction data organized by customer segment enable a contact center to view at a glance dissatisfaction trends by customer segment.

In yet another embodiment of the present invention, business process analytics can be generated for a plurality of interaction types in combination with a plurality of customer segments. For example, FIG. 13, illustrates business process analytics comprising generated dissatisfaction data aggregated by interaction type, and within each interaction type, generated dissatisfaction data is further aggregated by customer segment. Organization of dissatisfaction data by customer segment within an interaction type enables one to ascertain which business processes cause which customer segments dissatisfaction. In the example shown in FIG. 13, business process analytics is generated by customer segment for each interaction type for a particular day. However, it is contemplated that business process analytics can be generated for any selected time period.

Figure 11:
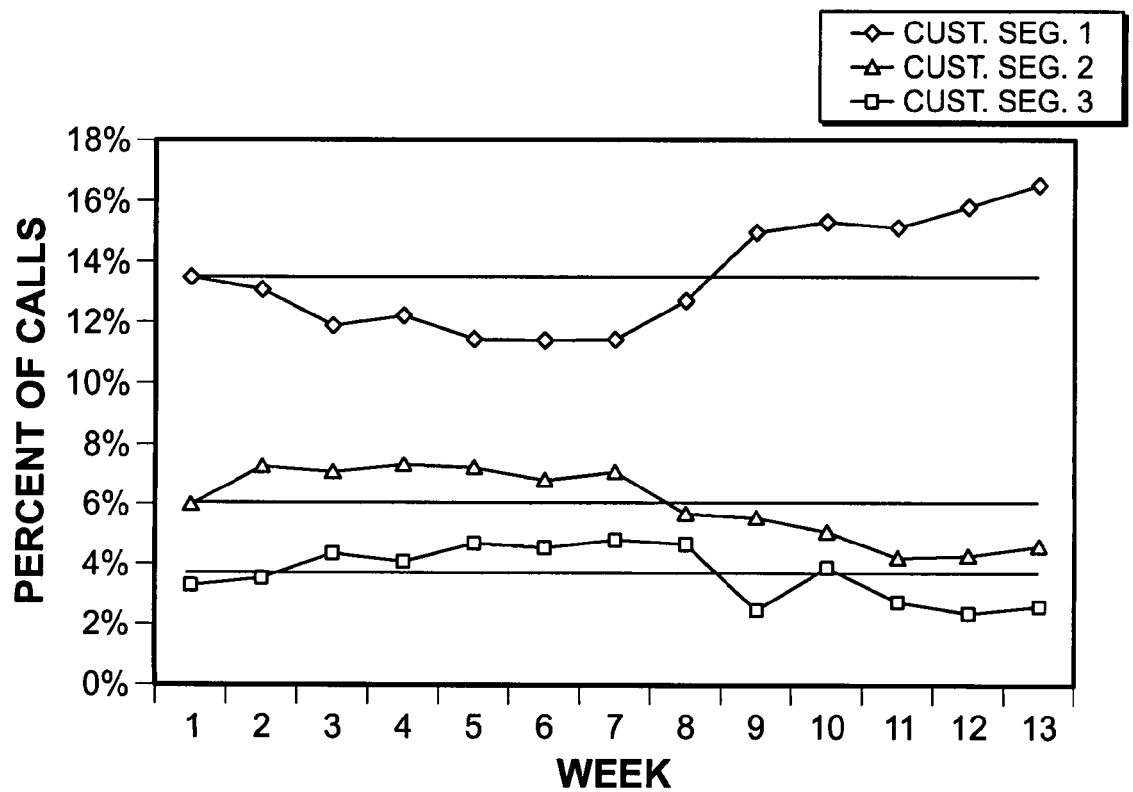
FIG. 11 is a graphical representation of generated business process analytics in accordance with the present invention.

FIG. 11 illustrates another embodiment of the present invention. FIG. 11 shows a chart plotting dissatisfaction frequency trend by customer segment. In the graphically depicted chart, three different customer segments are identified and the generated dissatisfaction data is then aggregated relative to the associated customer segments thereof. In this example, for each customer segment the dissatisfaction data comprises the percentage of interactions that received a dissatisfactory score.

While the specific embodiments have been illustrated and described, numerous modifications come to mind without significantly departing from the spirit of the invention, and the scope of protection is only limited by the scope of the accompanying Claims.

What is claimed is:

1. A non-transitory computer readable medium adapted to control a computer and comprising a plurality of code segments for aggregating data associated with a plurality of interactions between at least one customer and at least one agent for generating business process analytics, the non-transitory computer readable medium comprising:
    a code segment for organizing a plurality of agents based on a predetermined criteria;
    a code segment for selecting a range of the organized plurality of agents and identifying a plurality of interactions associated with the organized plurality of agents within the selected range;
    a code segment for receiving voice data associated with each of the identified interactions;
    a code segment for receiving agent call activity data associated with each of the identified interactions, the agent call activity data comprising at least one of agent on-call activity data, agent after-call activity data, agent screen analytics and agent desktop recording data;
    a code segment for receiving customer call activity data associated with each of the identified interactions;
    a code segment for receiving customer history data corresponding to each customer of each of the identified interactions;
    a code segment for analyzing the voice data, the agent call activity data, the customer call activity data, and the customer history data associated with each of the identified interactions; and
    a code segment for generating business process analytics for the identified interactions, the business process analytics comprising a code segment for generating dissatisfaction data for each of the identified interactions based on the analyzed voice data, the agent call activity data, the customer call activity data, and the customer history data.

2. The non-transitory computer readable medium of claim 1, wherein the code segment for generating business process analytics further comprises a code segment for categorizing each of the identified interactions into one of a plurality of category types based on at least one of the analyzed voice data, the agent call activity data, the customer call activity data, and the customer history data; and a code segment for aggregating the generated dissatisfaction data relative to the categorized interactions associated thereof.

3. The non-transitory computer readable medium of claim 1, wherein the dissatisfaction data for each of the identified interactions is defined by at least one distress event, the code segment for generating dissatisfaction data further comprising:
    a code segment for measuring each distress event occurring during each of the identified interactions according to a predetermined distress event scale;
    a code segment for generating a score for each of the identified interactions based on each of the measured distress events;
    a code segment for comparing the score for each of the identified interactions against a threshold score; and
    a code segment for identifying an interaction as a dissatisfactory interaction when the score of the interaction exceeds the threshold score.

4. The non-transitory computer readable medium of claim 3, wherein the dissatisfaction data for each of the identified interactions comprises a code segment for categorizing each distress event occurring during each of the identified interactions into one of a plurality of distress category types.

5. The non-transitory computer readable medium of claim 1, wherein the code segment for generating dissatisfaction data for each of the identified interactions is defined by at least one distress event, the non-transitory computer readable medium further comprising a code segment for incrementally registering each distress event occurring during the identified interactions.

6. The non-transitory computer readable medium of claim 1, wherein the code segment for generating dissatisfaction data for each of the identified interactions is defined by at least one distress event, the non-transitory computer readable medium further comprises a code segment for measuring each distress event occurring during the identified interactions in time units.

7. The non-transitory computer readable medium of claim 1, wherein customer history data comprises at least one of age, race, gender, income, behavioral type, customer spending, and customer tenure.

8. The non-transitory computer readable medium of claim 1 further comprising a code segment for generating a graphical user interface adapted to display the business process analytics of the identified interactions.

9. A non-transitory computer readable medium adapted to control a computer and comprising a plurality of code segments for aggregating data associated with a plurality of interactions between at least one customer and at least one agent for generating business process analytics, the non-transitory computer readable medium comprising:
    a code segment for identifying at least two of a plurality of interactions between at least one customer and at least one agent;
    a code segment for receiving voice data associated with each of the identified interactions, the code segment for receiving voice data comprising:
        a code segment for separating the voice data into customer voice data and agent voice data;
        a code segment for mining the separated agent voice data and the separated customer voice data and analyzing the separated agent voice data and the separated customer voice data by applying a linguistic-based psychological behavioral model to the separated customer voice data and the separated agent voice data; and a code segment for generating assessment data corresponding to the separated agent voice data and the separated customer voice data, the assessment data comprising behavioral assessment data;

a code segment for receiving agent call activity data associated with each of the identified interactions, the agent call activity data comprising at least one of agent on-call activity data, agent after-call activity data, agent screen analytics and agent desktop recording data;

a code segment for receiving customer call activity data associated with each of the identified interactions;

a code segment for receiving customer history data corresponding to each customer of each of the identified interactions;

a code segment for analyzing the assessment data, the agent call activity data, the customer call activity data, and the customer history data associated with each of the identified interactions;

a code segment for generating dissatisfaction data for each of the identified interactions based on the analyzed voice data, the agent call activity data, the customer call activity data, and the customer history data; and a code segment for generating business process analytics for the identified interactions, the business process analytics comprising dissatisfaction data.

10. The non-transitory computer readable medium of claim 9, wherein the code segment for receiving voice data further comprises:

a code segment for analyzing the separated agent voice data and the separated customer voice data by applying a distress based model to the separated agent voice data and the separated customer voice data; and a code segment for generating assessment data corresponding to the separated agent voice data and the separated customer voice data, the assessment data comprising voice distress assessment data.

11. The non-transitory computer readable medium of claim 9, wherein the code segment for receiving voice data further comprises:

a code segment for analyzing the received voice data by applying a non-linguistic event analysis thereto; and a code segment for generating assessment data corresponding to the received voice data, the assessment data comprising phone event assessment data.

12. The non-transitory computer readable medium of claim 9, wherein the code segment for generating business process analytics comprises a code segment for categorizing each of the identified interactions into one of a plurality of category types based on at least one of the analyzed assessment data, the agent call activity data, the customer call activity data, and the customer history data and a code segment for generating customer dissatisfaction data relative to the categorized interactions.

13. The non-transitory computer readable medium of claim 9, wherein the dissatisfaction data for each of the identified interactions is defined by at least one distress event, the code segment for generating dissatisfaction data further comprising:

a code segment for measuring each distress event occurring during each of the identified interactions according to a predetermined distress event scale;

a code segment for generating a score for each of the identified interactions based on each of the measured distress events;

a code segment for comparing the score for each of the identified interactions against a threshold score; and a code segment for identifying an interaction as a dissatisfactory interaction when the score of the interaction exceeds the threshold score.

14. The non-transitory computer readable medium of claim 13, wherein the dissatisfaction data for each of the identified interactions comprises a code segment for categorizing each distress event occurring during each of the identified interactions into one of a plurality of distress category types.

15. The non-transitory computer readable medium of claim 9, wherein the code segment for generating dissatisfaction data for each of the identified interactions is defined by at least one distress event, wherein the non-transitory computer readable medium further comprises a code segment for incrementally registering each distress event occurring during the identified interactions.

16. The non-transitory computer readable medium of claim 9, wherein the code segment for generating dissatisfaction data for each of the identified interactions is defined by at least one distress event, wherein the non-transitory computer readable medium further comprises a code segment for measuring each distress event occurring during the identified interactions in time units.

17. The non-transitory computer readable medium of claim 9 further comprising a code segment for generating a graphical user interface adapted to display the business process analytics of the identified interactions.

18. The non-transitory computer readable medium of claim 9, wherein customer history data comprises at least one of age, race, gender, income, behavioral type, customer spending, and customer tenure.

19. A system for aggregating data associated with a plurality of interactions between at least one customer and at least one agent for generating business process analytics, the system comprising:

a customer history database configured to store customer history data;

a first server comprising:

logic for identifying at least two of a plurality of interactions between at least one customer and at least one agent;

logic for receiving voice data associated with each of the identified interactions, the logic for receiving voice data comprising:

logic for separating the voice data into at least customer voice data and agent voice data;

logic for mining the separated agent voice data and the separated customer voice data;

logic for analyzing the separated agent voice data and customer voice data by applying a linguistic-based psychological behavioral model, a distress based model, and a non-linguistic event analysis to each of the separated customer voice data and the separated agent voice data; and logic for generating behavioral assessment data, distress assessment data, and phone event assessment data from the analyzed separated agent voice data and the separated customer voice data;

logic for receiving agent call activity data associated with each of the identified interactions, the agent call activity data comprising at least one of agent on-call activity data, agent after-call activity data, agent screen analytics and agent desktop recording data;

logic for receiving customer call activity data associated with each of the identified interactions;

logic for receiving customer history data corresponding to each customer of each of the identified interactions.

logic for analyzing the behavioral assessment data, the distress assessment data, the phone event assessment data, the agent call activity data, the customer call activity data, and the customer history data associated with each of the identified interactions;

logic for generating dissatisfaction data for each of the identified interactions based on the analyzed behavioral assessment data, the voice distress assessment data, the phone event assessment data, the agent call activity data, the customer call activity data, and the customer history data; and logic for generating business process analytics for each of the identified interactions, the business process analytics comprising dissatisfaction data; and logic for communicating with a customer history database.

* * * * *